United States Patent [19]

Matsuda et al.

[11] Patent Number: 5,726,353
[45] Date of Patent: Mar. 10, 1998

[54] SYSTEM FOR DETECTING TORQUE OF AUTOMATIC VEHICLE TRANSMISSION AND CONTROLLING THE SAME BASED ON DETECTED TORQUE

[75] Inventors: Takahiro Matsuda; Takamichi Shimada, both of Wako, Japan

[73] Assignee: Honda Giken Kogyo Kabushiki Kaisha, Tokyo, Japan

[21] Appl. No.: 752,934

[22] Filed: Nov. 20, 1996

[30] Foreign Application Priority Data

Nov. 21, 1995 [JP] Japan .................... 7-326443

[51] Int. Cl.$^6$ ........................................ G01L 3/14
[52] U.S. Cl. .................. 73/118.1; 73/112; 73/862.191; 180/338; 180/383
[58] Field of Search ..................... 73/112, 118.1, 73/862.08, 862.191, 862.29, 862.31, 862.321, 862.195; 180/338, 364, 368, 383; 324/161

[56] References Cited

U.S. PATENT DOCUMENTS

| | | | |
|---|---|---|---|
| 4,444,064 | 4/1984 | Wolfinger | 73/862.34 |
| 4,468,958 | 9/1984 | Takeshita | 73/118.1 |
| 4,513,628 | 4/1985 | Kohama et al. | 73/862.34 |
| 4,542,460 | 9/1985 | Weber | 73/862.191 |
| 4,592,241 | 6/1986 | Obayashi et al. | 73/862.34 |
| 4,748,565 | 5/1988 | Toya | 324/161 |
| 5,086,648 | 2/1992 | Sano et al. | 73/118.1 |
| 5,097,699 | 3/1992 | Sano et al. | 73/118.1 |
| 5,142,903 | 9/1992 | Mizushina et al. | 73/118.1 |
| 5,144,834 | 9/1992 | Sano et al. | 73/118.1 |
| 5,189,908 | 3/1993 | Sano et al. | 73/118.1 |
| 5,209,110 | 5/1993 | Sano et al. | 73/118.1 |
| 5,445,016 | 8/1995 | Neigebauer | 73/118.1 |
| 5,515,272 | 5/1996 | Sakai et al. | 73/118.1 |

FOREIGN PATENT DOCUMENTS

| | | |
|---|---|---|
| 0419101A1 | 3/1991 | European Pat. Off. . |
| 0651181A1 | 5/1995 | European Pat. Off. . |
| 3812673A1 | 11/1988 | Germany . |
| 3-37022 | 5/1984 | Japan . |
| 1-21255 A | 1/1989 | Japan . |
| 6-20915 | 6/1994 | Japan . |

OTHER PUBLICATIONS

Patent Abstracts of Japan vol. 95, No. 006, 31 Jul. 1995, JP 07 072024.

*Primary Examiner*—George M. Dombroske
*Assistant Examiner*—Eric S. McCall
*Attorney, Agent, or Firm*—Nikaido, Marmelstein, Murray & Oram LLP

[57] ABSTRACT

The torque detection system for a continuously variable transmission for a vehicle having a dual-mass flywheel connecting an output of an engine mounted on the vehicle to the transmission and a start clutch for engaging/disengaging the transmitted power to the vehicle wheels. The dual-mass flywheel comprises of two flywheel components coupled by a torsion spring. Rotational speeds of the two flywheel components are detected and a phase angle therebetween is then calculated. A torque estimated to be input to the start clutch is determined by retrieving predetermined characteristics defining a static torque set with respect to the phase angle. When the vehicle is braked to stop in engine idling state, the clutch oil pressure is determined based on the calculated torque.

22 Claims, 17 Drawing Sheets

FIG.7

| SPOOL POSITION (GEAR RANGE) | CLUTCH FOR FORWARD TRAVELING | BRAKE FOR REVERSE TRAVELING |
|---|---|---|
| P | OFF | OFF |
| R | OFF | ON |
| N | OFF | OFF |
| D | ON | OFF |
| S | ON | OFF |
| L | ON | OFF |

SYSTEM FOR DETECTING TORQUE OF AUTOMATIC VEHICLE TRANSMISSION AND CONTROLLING THE SAME BASED ON DETECTED TORQUE

BACKGROUND OF THE INVENTION

1. Field of the Invention

The present invention relates to a system for detecting torque detection of an automatic vehicle transmission and for controlling the same based on the detected torque, and in particular relates to a system for detecting torque of an automatic transmission mounted in a vehicle and controlling engagement of an frictional engaging element such as a clutch of the transmission based on the detected torque.

2. Description of the Related Art

Recent vehicle control requires accuracy. For example, in an automatic vehicle transmission which includes a plurality of gear trains having different gear ratios, the engagement or disengagement (release) of frictional engaging elements such as hydraulic clutches or brakes and some similar elements are controlled through oil pressure based on parameters including torque input to and output from the transmission to decrease a shock occurring in gear shifting. For that purpose, the torque input to the frictional engaging element such as a clutch needs to be detected. Moreover, it is desirable in a continuously variable vehicle automatic transmission to control engaging or disengaging of the frictional engaging element such as a start clutch based on the input torque such that the vehicle smoothly starts to run. The detection of the torque input to the transmission is similarly needed in this kind of control.

Various techniques have hitherto been proposed to detect the torque in an automatic vehicle transmission. Japanese Laid-Open Patent Application No. Sho 64 (1985)-21255 teaches to detect the torque acting on the transmission input shaft by forming a plurality of slanted grooves having anisotropic properties on the shaft while positioning a detection coil keeping a distance from the grooves such that it detects the change of magnetic flux generated by the shaft torsion. The prior art teaches using the detected torque in the oil pressure control of an automatic vehicle transmission so as to decrease the shock that occurs during gear shifting.

Another reference, Japanese Patent Publication No. Hei 3 (1991)-37022 discloses a diesel engine having a dual-mass flywheel made up of two flywheel components coupled together by an elastic member for suppressing torque fluctuation, and detecting the rotational speeds of each flywheel components. Since there could occur a resonance between the two flywheel components due to the engine speed drop under idling, the prior art discloses detecting the rotational speeds of the flywheel components using magnetic pickups to determine the speed difference which is a sign of the resonance. Specifically, the speed difference is determined by a subtracter and when the obtained speed difference exceeds a threshold value indicative of a sign of the resonance, the amount of fuel injection is increased to raise the engine speed so as to avoid the occurrence of the resonance during engine idling.

Moreover, in a vehicle with a hydraulic transmission having no torque convertor, e.g., a continuously variable transmission using a start clutch, it has hitherto been proposed to control oil pressure to be supplied to the frictional engaging element such as a start clutch so as to regulate creep torque properly. In the prior art, to be more specific, the manifold pressure, instead of the torque, is detected and the control is conducted based on the detected manifold pressure to decrease the vibration or juddering and to improve fuel economy under engine idling when the vehicle is stopped.

In the prior art torque detection disclosed in the reference of Japanese Laid-Open Patent Application Sho 64-21255, however, to form the anisotropic grooves on the input shaft with the use of a hobbing machine, etc., is tedious and time-consuming, rendering the configuration complicated. Although the prior art suggests to attach an anisotropic amorphous film having slits on the input shaft, repeated shaft torsion could cause the film to be removed from the shaft and is still disadvantageous in that it requires the coil for detecting the change of magnetic flux on the film.

Furthermore, the second prior art disclosed in Japanese Patent Publication No. Hei 3-37022 is based on the fact that the speed difference between the two flywheel components becomes in antiphase and maximum when the components begin to resonate. However, the prior art merely discloses comparing a maximum speed difference with the threshold value and when the difference is found to exceed the value, increasing the amount of fuel injection. The prior art teaches nothing to detect the torque.

With regard to the prior art mentioned in the last reference which discloses controlling oil pressure supply to the frictional engaging element based on the manifold pressure to regulate the creep torque, the control becomes disadvantageously complicated when the manifold pressure fluctuates due to an external factor. For example, when an air conditioner is brought into operation, it becomes necessary to detect the operation and add the amount of manifold pressure corresponding to the torque consumed by the air conditioner to correct a desired manifold pressure.

SUMMARY OF THE INVENTION

An object of the invention is therefore to overcome the problems in the prior art described above, and to provide a system for detecting the torque of an automatic vehicle transmission which requires no specific torque sensor for detecting the torque.

A second object of the invention is therefore to provide a system for controlling oil pressure of an automatic vehicle transmission, which controls oil pressure supply to a frictional engaging element such as a clutch based on the detected torque to conduct a stable oil pressure control free from disturbance thereby resulting in an optimum engaging of the frictional engaging element.

In order to achieve the objects, there is provided a system for detecting a torque in an automatic transmission mounted on a vehicle having an engine and wheels to be driven by power transmitted from the engine through the transmission, comprising an elastic coupling means connected to an output shaft of the engine; detecting means for detecting a rotational speed input to the elastic coupling means; detecting means for detecting a rotational speed output from the elastic coupling means; a frictional engaging element provided for engaging/disengaging power transmitted to the wheels; and torque calculating means for calculating a first torque based on a difference between the detected rotational speeds when the frictional engaging element is in an engaged state and a second torque based on the difference between the detected rotational speeds when the frictional engaging element is in a disengaged state, to calculate a torque estimated to be actually input to the frictional engaging element based on the first torque and the second torque.

BRIEF DESCRIPTION OF THE DRAWINGS

The above and other objects and advantages of the invention will be more apparent from the following description and drawings, in which:

FIG. 7 is a tabular view showing the relationship between the gear range and the operation of a clutch for forward traveling and a brake for reverse traveling;

DETAILED DESCRIPTION OF THE PREFERRED EMBODIMENTS

With reference to the appended drawings, a detailed description of the preferred embodiments will be given below.

Figure 1:
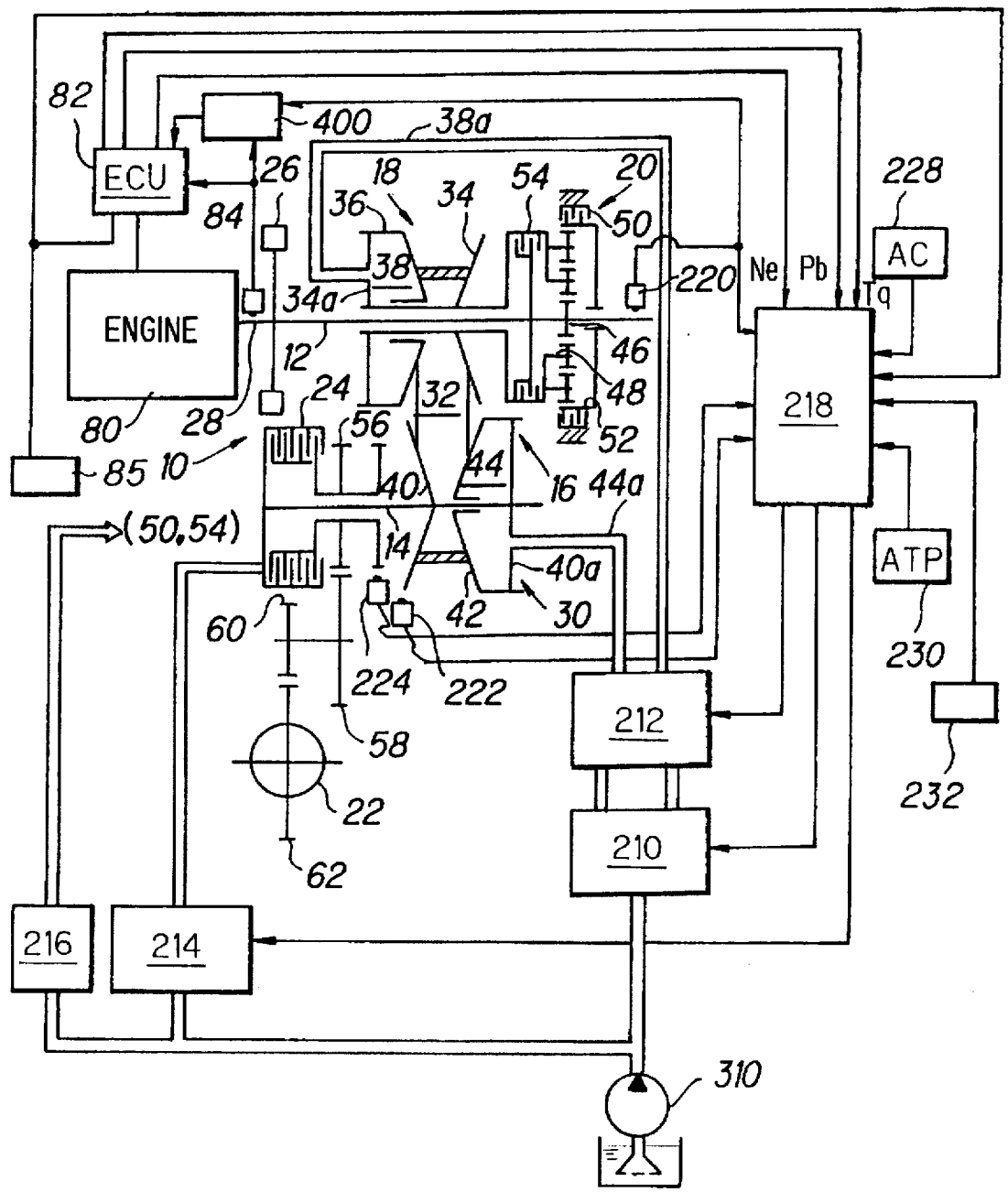
FIG. 1 is a schematic diagram showing the overall configuration of a system for detecting torque of an automatic vehicle transmission and controlling the same based on the detected torque according to the present invention, taking as example a V-belt drive continuously variable transmission including a dual-mass flywheel provided between the engine and the transmission and a frictional engaging element, i.e., a start clutch in the transmission.

FIG. 1 is a schematic diagram showing the overall configuration of a system for detecting torque of an automatic vehicle transmission and controlling the same based on the detected torque according to the present invention, taking as example a V-belt drive continuously variable transmission including a dual-mass flywheel provided between the engine and the transmission and a frictional engaging element, i.e., a start clutch in the transmission.

For the ease of understanding, the V-belt drive continuously variable transmission is explained first.

The transmission 10 has a transmission input shaft 12 and a counter shaft 14 and a mechanical V-belt drive mechanism 16 provided therebetween, a movable drive-side pulley 18, a planetary-geared forward/reverse switching mechanism 20, an output device 22 such as a differential, and a frictional engaging element, i.e., a start clutch 24 provided between the counter shaft 14 and the output device 22. The continuously variable transmission 10 is mounted on a vehicle and the transmission input shaft 12 is connected with an output shaft 28 of an internal combustion engine 80 via an elastic coupling means, i.e., a dual-mass flywheel 26. The power transmitted to the differential 22 through gears 56, 58 is finally transmitted to left and right wheels (neither shown in FIG. 1).

The dual-mass flywheel 26 will briefly be explained with reference to FIGS. 2 and 3.

Figure 2:
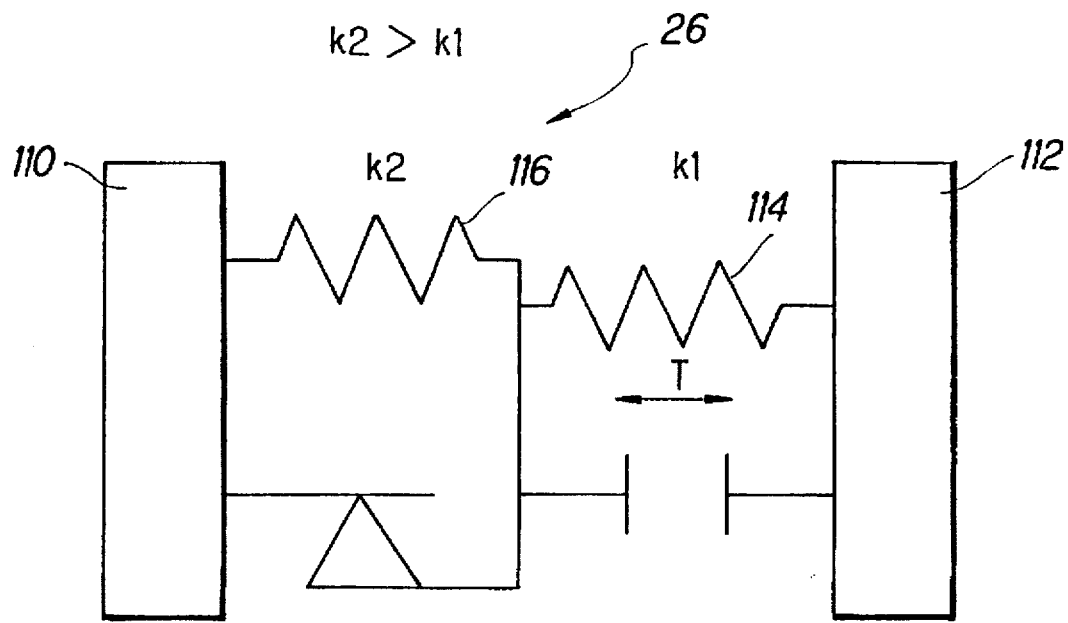
FIG. 2 is an explanatory skeleton view showing the operation of a torque transmission of the dual-mass flywheel shown in FIG. 1.
Figure 3:
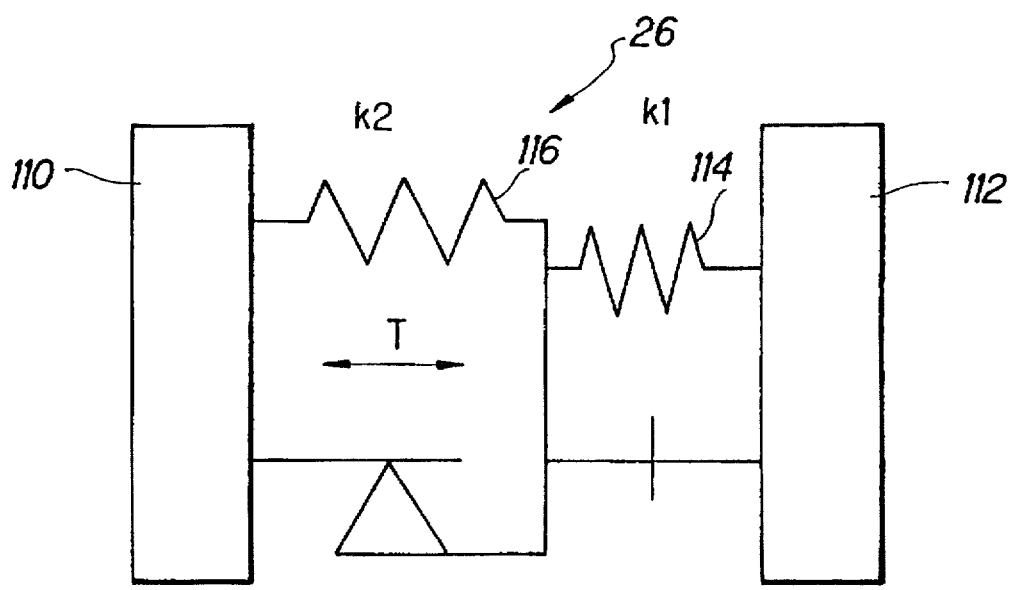
FIG. 3 is a view, similar to FIG. 2, but showing the operation of another torque transmission of the flywheel.

FIG. 2 is a skeleton view that shows the configuration of the dual-mass flywheel. As disclosed, the flywheel can be divided into two flywheel components, i.e., an engine-output-side component 110 and transmission-input-side component 112, which are coupled by torsion springs 114, 116. Thus, the flywheel constitutes a spring-mass system. In the dual-mass flywheel, the spring rate k1 of the first torsion spring 114 is set to be less than that k2 of the second torsion spring 116. The torque T is therefore transmitted by the spring rate k1 by a predetermined level as illustrated in FIG. 2, and when the torque T grows and exceeds to the upper limit of the level, it will then be transmitted by the second torsion spring 116 as is shown in FIG. 3. Thus, the amount of torque transmission by the dual-mass flywheel 26 is determined by either of the two kinds of spring rates depending on the amount of torque T to be transmitted.

The dual-mass flywheel 26 can decrease the engine output torque fluctuation (that becomes large under engine idling or at a low engine speed) and prevent the vibration or juddering from being transmitted to the transmission, thereby avoiding the occurrence of resonance or noise in the drive train. Since the start clutch 24 is provided downstream of the transmission mechanism (made of the mechanical V-belt drive mechanism 16 and the forward/reverse switching mechanism 20) such that the engine and the transmission mechanism are connected directly, the role of the dual-mass flywheel is significant. This kind of dual-mass flywheel is known from Japanese Utility Model Publication No. Hei 6 (1994)-20915, etc., no further description would be needed.

Again returning to the explanation of FIG. 1, the mechanical V-belt drive mechanism 16 is made up of the aforesaid pulley 18 mounted on the input shaft 12, the pulley 30 mounted on the counter shaft 14, and a mechanical V-belt 32 connecting the pulleys. The pulley 18 has a fixed pulley half 34 rotably mounted on the input shaft 12, and another movable pulley half 36 which is movable with respect to the first pulley half 34 along the pulley axis. A drive-side cylinder 38 is formed at the side of the pulley half 36 by a cylinder wall 34a such that the oil pressure in the cylinder 38 if supplied via an oil path 38a generates lateral pressure to move the pulley half 36 along the axis.

The driven-side movable pulley 30 has a fixed pulley half 40 rotably mounted on the counter shaft 14 and a movable pulley half 42 which is movable with respect to the first pulley half along the pulley axis. A driven-side cylinder 44 is formed at the side of the pulley half 42 by a cylinder wall 40a such that the oil pressure in the cylinder 44 if supplied via an oil path 44a generates lateral pressure to move the pulley half 42 along the axis. By regulating the oil pressure to the cylinders 38, 44 appropriately, it becomes possible to provide a proper lateral pressure such that the pulley width is changed and the radii of pulley connections are changed without causing the V-belt to slip to continuously vary the speed ratio (gear ratio).

The forward/reverse switching mechanism 20 comprises a sun gear 46 fixed on the input shaft 12, a carrier 48 connected to the fixed pulley half 34, a ring gear 52 to be held in position by a frictional engaging element, i.e., a brake 50 for reverse traveling, another frictional engaging elements, i.e., a clutch 54 for forward traveling that couples the sun gear 46 and the carrier 48. When the clutch 54 is engaged, all gears (the sun gear 46, the carrier 48 and the ring gear 52) rotate integrally with the input shaft 12, and the drive-side pulley 18 is driven in the same direction (in the forward traveling direction) as the input shaft rotation. When the brake 50 is engaged, since the ring gear 52 is brought into a fixed state, the carrier 48 is then driven in a direction opposite to the rotation of the sun gear 46, making the drive-side pulley 18 to be driven in the opposite direction (in the reverse traveling direction) from the input shaft rotation. When both the clutch 54 and the brake 50 are disengaged, the power transmission through the forward/reverse switching mechanism 20 is discontinued so that no power transmission is made between the engine 80 and the drive-side pulley 18.

The start clutch 24 is a clutch for ON/OFF control of the power transmission between the counter shaft 14 and the differential 22 and when it is engaged (ON), it becomes possible to transmit power therebetween. Thus, when the start clutch 24 is made ON, the engine output transmitted through the mechanical V-belt drive mechanism 16 is transmitted to the wheels through the gears 56, 58, 60 and 62 and the differential 22. On the other hand, when the start clutch 24 is made OFF (disengaged), no power transmission therebetween is possible and the transmission is in the neutral state. Moreover, the start clutch 24 is slip-controlled to transmit power partially.

The control system for controlling the operation of the continuously variable transmission 10 will be explained next.

The control system includes a group of regulator valves 210 for generating pulley control oil pressure to be supplied to the drive-side cylinder 38 and the driven-side cylinder 40, a group of shift control valves 212 for controlling the supply of the pulley control oil pressure to the cylinders 38, 44, a clutch control valve 214 for controlling the operation of the start clutch 24, and a manual valve 216 which operates in response to the position of a selector lever provided near the vehicle driver seat. The operation of the group of regulator valves 210, the group of shift control valves 212 and the clutch control valve 214 is conducted in response to signals output from a controller 218.

For that purpose, the controller 218 is provided with signals indicative of engine operation parameters including the engine speed Ne, the throttle position θ TH and the manifold absolute pressure Pb from an ECU (Electronic Control Unit) 82 used there in engine operation control. Among the signals which the ECU 82 receives, only an engine speed sensor 84 (made up of, for example, an electronic pickup) and a throttle position sensor 85 are illustrated in FIG. 1 and others are omitted for simplicity.

Further, there are provided first to third speed sensors 220, 222, 224 (all made up, for example, of an electronic pickup) which generate a signal Ndr indicative of the rotational speed of the input shaft 12, a signal Ndnp indicative of the rotational speed of the driven-side pulley 30, and a signal Ndns indicative of the rotational speed of the gear 56 (provided next to the start clutch 24), and send the same to the controller 218. Additionally, there are provided an air conditioner switch 228 for generating a signal AC indicative of the operation of an air conditioner (not shown), a position switch 230 for generating a signal ATP indicative of gear range D, N, P . . . , based on the selected position of the selector lever or the position of a spool in the aforesaid manual shift lever 216, a brake switch 232 for a generating a signal indicative of the operation of a foot brake (not shown) mounted at the vehicle. A converter 400 is further provided for calculating a torsional phase angle of the dual-mass flywheel 26 which will later be explained in detail.

The drive-side cylinder 38 and the driven-side cylinder 44 are connected to the group of the shift control valves 212, while the start clutch 24 is connected to the clutch control valve 214. The brake 50 for reverse traveling and the clutch 54 for forward traveling in the forward/reverse switching mechanism 20 are connected to the manual valve 216.

The details of the valves will next be explained with reference to FIGS. 4 and 5. Since the configuration of the valves has no direct relationship with the gist of the invention, the explanation will be brief.

Figure 4:
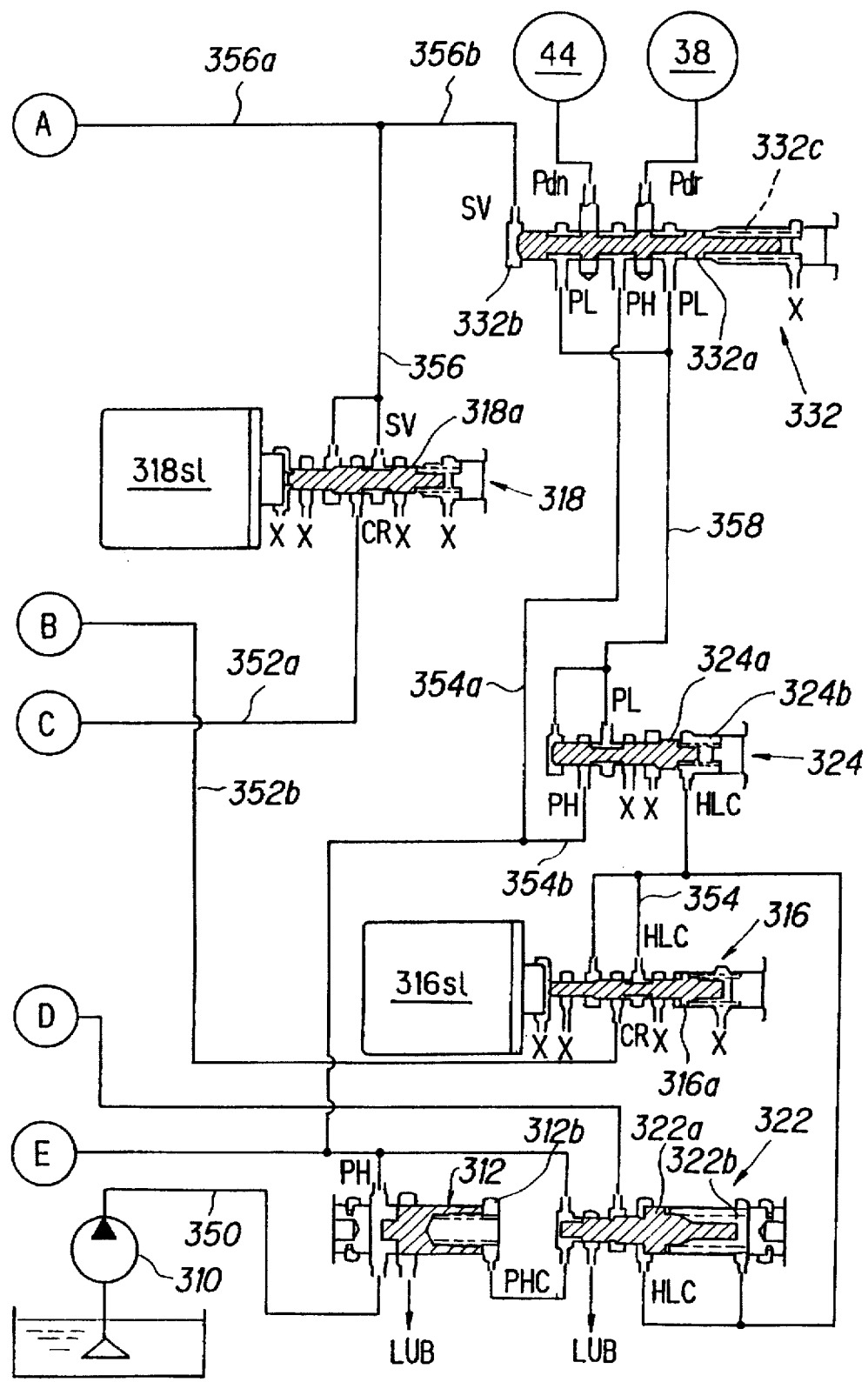
FIG. 4 is a first half of oil pressure circuit diagram of a group of shift control valves and some similar valves shown in FIG. 1.
Figure 5:
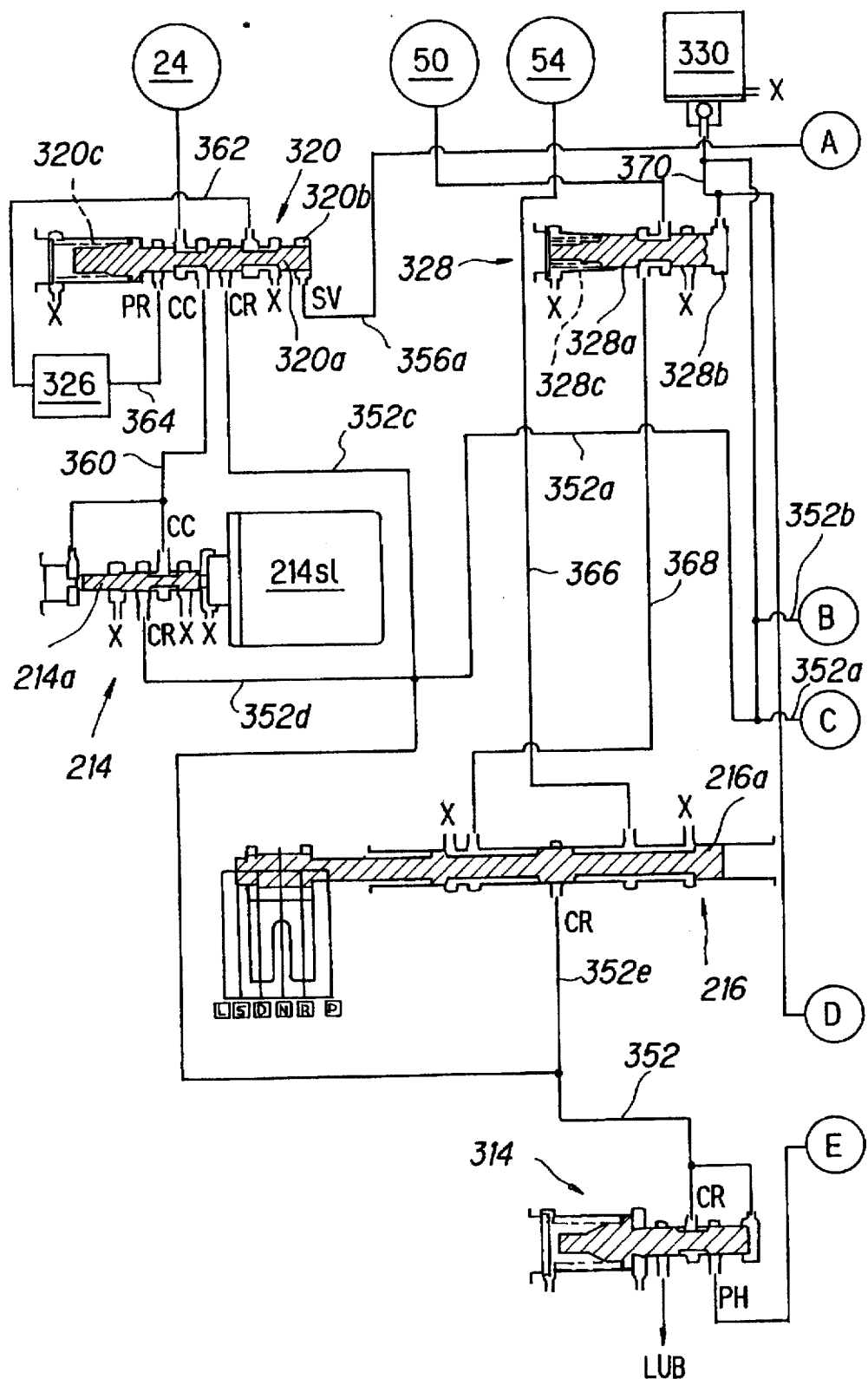
FIG. 5 is a second half of the oil pressure circuit diagram of the FIG. 4.

FIGS. 4 and 5 are oil pressure circuit diagrams in which oil paths indicated by A to E are connected with each other such that it constitutes a single oil pressure circuit. The mark "x" assigned at a port in the figures indicates the port is connected to the oil drainage. The mark "LUB" assigned at a port indicates the port is connected to a lubrication valve (not shown).

The pressurized oil pumped by an oil pump 310 from the oil reservoir is supplied to a high-pressure regulator valve 312 via an oil path 350 and is regulated there to a predetermined high pressure PH for pulley control (explained later). The oil under the pressure PH is supplied to a reducing valve 314 and is regulated to a clutch-reducing pressure CR having a constant oil pressure. The oil under the pressure CR is supplied to a high-low-pressure control valve 316, a shift control valve 318, and a shift inhibiter valve 320 via oil paths 352b, 352a, 352c. The oil under the pressure CR is also supplied to the clutch control valve 214 via an oil path 352d and to the manual valve 216 via an oil path 352e.

The high-low-pressure control valve 316 has an electromagnetic solenoid 316sl with a plunger which pushes a spool 316a in the valve in response to the amount of current supplied such that a back control pressure HLC is supplied to an oil path 354. The oil pressure HLC is sent to a right oil chamber 322b of a high-pressure control valve 322 and a right oil chamber 324b of a low-pressure control valve 324 and acts to push spools 322a, 324a in the valves to the left. It should be noted that terms indicative of the direction or position such as "left" "right" "above" are used in this description to mean the direction or position viewed from the figures.

The high-pressure control valve 322 receives the back control pressure HLC, generates a high back control pressure PHC for controlling a high pulley control oil pressure PH and supplies to a right oil chamber 312b of the high-pressure regulator valve 312. The high-pressure regulator valve 312 receives the pressure PHC and regulates the pressure of oil pumped by the pump 310 and supplied via an oil path 350, and generates the high pulley control pressure PH. The oil pressure is supplied to the shift valve 332 via an oil path 354a and a low-pressure regulator valve 324 via an oil path 354b. The low-pressure regulator valve 324 regulates the high pulley control pressure PH supplied via the oil path 354b by the back control pressure HLC and generates a low pulley control pressure PL (that is lower than the pressure PH).

The group of the regulator valves 210 comprises of the high-low-pressure control valve 316, the high-pressure regulator valve 312, the high-pressure control valve 322 and the low-pressure regulator valve 324.

The shift control valve 318 also has an electromagnetic solenoid 318sl with a plunger which pushes a spool 318a in the valve in response to the amount of current supplied to regulate the clutch reducing pressure CR supplied from the oil path 352a and generates a shift control pressure SV that is supplied to the shift inhibiter valve 320 and the shift valve 332 via an oil paths 356a, 356b. The shift inhibiter valve 320 receives the clutch reducing pressure CR via the oil path 352c. A spool 320a of the shift inhibiter valve 320, which is biased to the right by a left spring 320c, moves, upon receipt of the shift control pressure SV in its right oil chamber 320b, to the left against the spring force. A spool 332a of the shift valve 332, which is biased to the left by a right spring 332c, moves, upon receipt of the shift control pressure SV in its left oil chamber 332b, to the right against the spring force. The group of the shift control valves 212 comprises the shift control valve 318, the shift inhibiter valve 320 and the shift valve 332.

The operation of the shift valve 332 will now be explained.

The shift valve 332 receives the shift control pressure SV in its left oil chamber 332b. A spool 332a of the shift valve, which is biased to the left by a right spring 332c, moves, upon receipt of the pressure SV, to a position in which the pressure SV and the spring force is balanced. As a result, it is possible to control the position of the spool 332a by regulating the pressure SV through the shift control valve 318. The shift valve 332 also receives the high pulley control pressure PH via the oil path 354a and low pulley control pressure PL sent from the low-pressure regulator valve 324 via an oil path 358. The pulley control pressures PH, PL are selectively distributed to the drive-side cylinder 38 and the driven-side cylinder 40 via oil paths depending on the position of the spool 332a.

Figure 6:
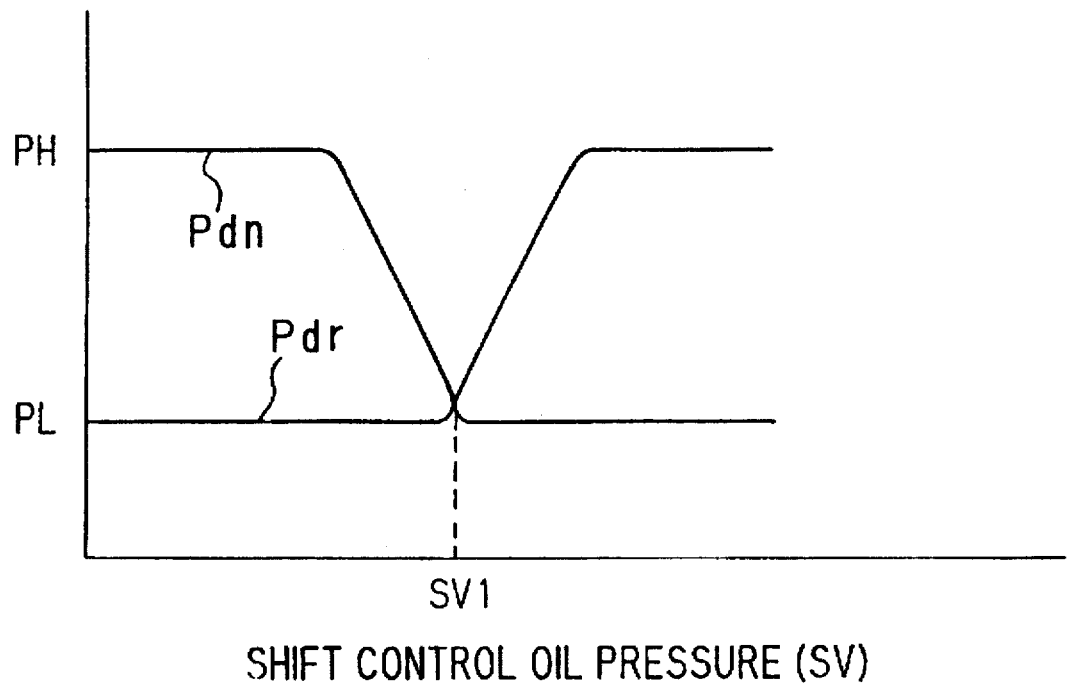
FIG. 6 is an explanatory graph showing the relationship between the pulley control oil pressure and the shift control oil pressure.
Figure 8:
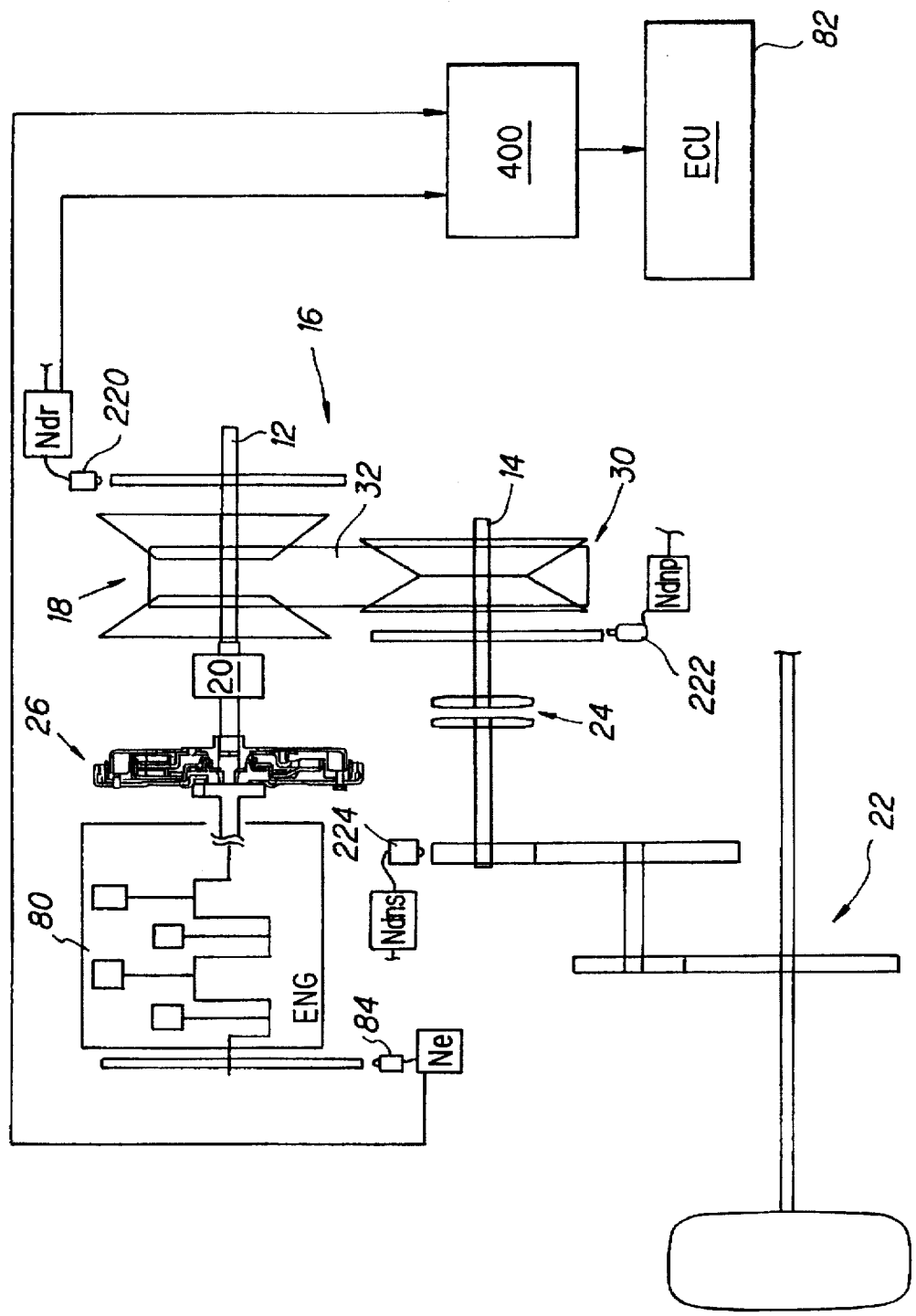
FIG. 8 is a view which is a portion taken out from FIG. 1 and showing the configuration of the torque detection system according to the invention.

The position of the spool 332a corresponds to the shift control pressure SV and when the pressure is at a shift control pressure SV1 explained with reference to FIG. 6, the spool 332a is at the neutral position (the position shown in FIG. 4). When the shift control pressure SV is raised such that the spool 332a moves from the neutral position to the right, the drive-side cylinder 38 is provided with the high pulley control pressure PH, while the driven-side cylinder 44 is provided with the low pulley control pressure PL. On the contrary, when the spool 332a moves to the left, the cylinder 38 is supplied with the low pressure PL, while the cylinder 44 is supplied with the high pressure PH. More specifically, the relationship among the shift control pressure SV, the pressure Pdr in the drive-side cylinder 38 and the pressure Pdn in the driven-side cylinder 44 is as shown in FIG. 6. As will be apparent from the figure, by regulating the shift control pressure SV to be supplied to the shift valve 332 to control the position of the spool 332a, it is possible to control the driven cylinder pressure Pdr and the driven cylinder pressure Pdn to achieve a desired speed ratio.

The clutch control valve 214 has an electromagnetic solenoid 214sl with a plunger which pushes a spool 214a in the valve in response to the amount of current supplied to regulate the clutch reducing pressure CR supplied from the oil path 352d and generates a clutch control pressure CC that is supplied to the shift inhibiter valve 320. The shift inhibiter valve 320 supplies the clutch control pressure CC (sent from an oil path 360) to the start clutch 24, when its spool 320a moves to the right. The staff clutch 24 is then engaged by the clutch control pressure CC generated by the clutch control valve 214.

The shift control pressure SV provided in the right oil chamber 320b of the shift inhibiter valve 320 increases as the speed ratio in the transmission 10 decreases toward a lower value (i.e., the top gear in a stepped transmission). Explaining this in other words, in order to decrease the speed ratio, it is necessary to make the pulley width (the distance between the pulley halves 34, 36) at the drive-side pulley 18 narrower than that at the driven-side pulley 30 such that the radius of the connecting belt 32 at the drive-side pulley 18 becomes larger than that at the driven-side pulley 30. The pressure to be supplied to the drive-side cylinder 38 must therefore be greater than that supplied to the driven-side cylinder 44. This is achieved as mentioned above by raising the shift control pressure SV to be supplied to the left oil chamber 332b of the shift valve 332 to move its spool 332a to the right such that the drive-side cylinder 38 is provided with the high pulley control pressure PH, while the driven-side cylinder 44 is supplied with the low pulley control pressure PL.

As a result, the speed ratio is shifted toward a small value as the vehicle speed increases and the shift control pressure SV supplied to the right oil chamber 320b of the shift inhibiter valve 320 increases, the spool will then be moved to the left against the spring force. At that time, the clutch reducing pressure CR is supplied to a pitot regulator valve 326 via an oil path 362 to be regulated at a pitot pressure PR that is in proportion to the engine speed Ne. The pressure PR is returned to the shift inhibiter valve 320 via an oil path 364 and is eventually supplied to the start clutch 24. More specifically, when the speed ratio in the transmission has the smallest value (corresponding to the top gear), usually at a high vehicle speed, the start clutch 24 is engaged in response to the pitot pressure.

The manual valve 216 is connected to the selector lever near the driver seat through a cable and its spool 216a is moved to a position corresponding to one among P, R, N, D, S, L positions selected by the driver as illustrated in FIG. 5. In the figure the spool 216a is at the N (neutral) position. The manual valve 216 operates to supply the clutch reducing pressure CR sent from an oil path 352e to the clutch 54 for forward traveling via an oil path 366 or the brake 50 for reverse traveling via an oil path 368 depending on the position of its spool 216a. FIG. 7 shows the relationship between the gear range (the position of the spool 216a) and the operation of the clutch 54 for forward traveling and the brake 50 for reverse traveling. In the P or N range, for example, the clutch 54 and the brake 50 are disengaged to discontinue the power transmission through the forward/reverse switching mechanism 20 such that there is no power transmission between the engine 80 and the drive-side pulley 18, i.e., the V-belt drive mechanism 16 does not transmit power.

A reverse inhibiter valve 328 is provided in the oil path connected to the brake 50 for reverse traveling. The reverse inhibiter valve 328 has a right oil chamber 328b that is connected to the oil paths 352a, 352b, and its spool 328a is biased to the right by a left spring 328c. The right oil chamber 328b is further connected to an electromagnetic valve 330 via an oil path 370. When the electromagnetic valve is supplied with no current to close its drain port, the clutch reducing pressure CR sent from the oil path 352a, 352b is supplied to the right oil chamber. This causes the spool 328a to move to the left to connect the oil path 368 to the brake 50 for reverse traveling such that when the clutch reducing pressure CR is supplied from the manual valve 316, the brake 50 is supplied with the pressure to establish a reverse speed ratio.

When the vehicle is forward traveling at a speed greater than a predetermined speed in the D or S or L range, if the manual valve 216 is moved to a position corresponding to the R range, the electromagnetic valve 330 is subject to duty-ratio control (in the Pulse Width Modulation), a medium pressure that is lower than the clutch reducing pressure CR is supplied to the right oil chamber 328b of the reverse inhibiter valve 328. Since the medium pressure is set to be insufficient to move the spool 328a to the left, the clutch reducing pressure CR to the brake 50 from the oil path 368 is stopped by the reverse inhibiter valve 328 to prevent the transmission from being damaged.

The torque detection system and control system according to the invention are utilized on the continuously variable transmission 10 and its control device mentioned above, which will now be explained.

For the brevity of understanding, a portion including the torque detection system according to the invention is taken out from FIG. 1.

The torque detection system according to the invention is based on the finding that the dual-mass flywheel 26 can be used as a kind of torque sensor. For that purpose, a phase angle between the torsional angles of the dual-mass flywheel components is detected, the torque input to the transmission is then obtained based on the detected torsional phase angle and the torque estimated to be actually input to the start clutch is calculated.

Figure 9:
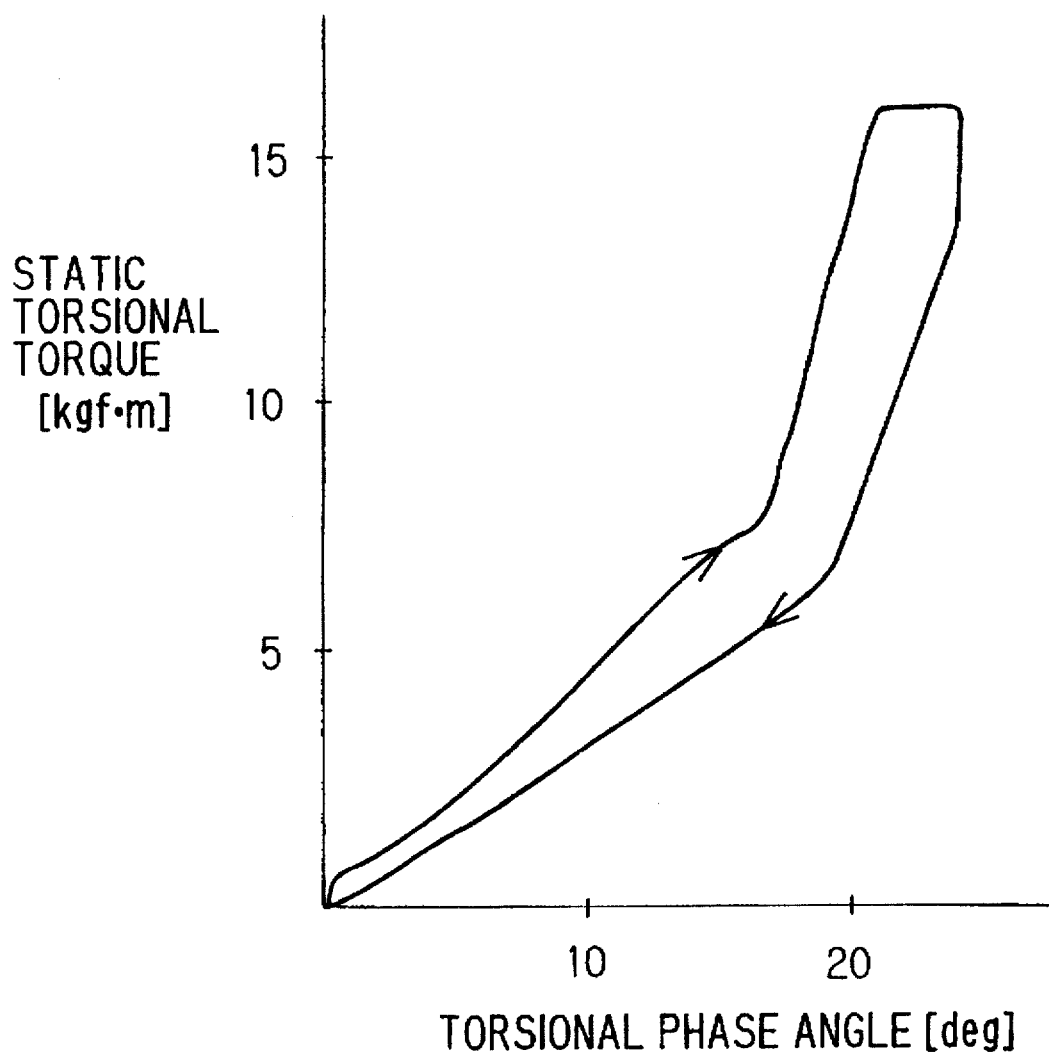
FIG. 9 is an explanatory graph showing the relationship between the torsional phase angle and static torsional torque of the dual-mass flywheel shown in FIG. 8.

The dual-mass flywheel 26 has predetermined static characteristics of torsion, i.e., the static torsional torque with respect to the static phase angle between the torsional angles, as shown in FIG. 9. The characteristics are stored in advance as mapped data in the ROM of the ECU 82. As disclosed in the figure, although the characteristics have a hysterisis, averaged values are calculated to be used as the mapped data. The converter 400 receives the signal Ne output from the engine speed sensor 84 and the signal Ndr output from the input shaft speed sensor 220 and based on the signals corresponding to the rotational speeds of two flywheel components (masses), calculates a value indicative of a change of the relative displacement between the two masses with respect to time, i.e., the torsional phase angle.

This will be explained with reference to FIG. 10.

Since the engine output torque fluctuates, the speeds Ne, Ndr detected by the sensors 84, 220 have similar fluctuations. Since the dual-mass flywheel functions to decrease the torque fluctuation, the magnitude of the fluctuation in Ndr is less than that in Ne. Due to the torsion between the two masses (flywheel components), Ndr is behind, resulting the torsional phase angle θc in proportion to the torsional angle. The converter counts the torsional phase angles in digital values, and converts and generates into analog values per pitch in the signal.

The torsional phase angle θc detected by the converter 400 is sent to the ECU 82 where an agerage value θc-av is calculated and the calculated value is compared with the aforesaid predetermined static characteristics to determine the torque input to the transmission, more specifically it is used as an address in the mapped data to retrieve the torque (i.e., the static torsional torque) input to the transmission. If the calculated phase angle is a negative value, this means the torque has the engine braking effect.

The operation of the system according to the invention for detecting and controlling the start clutch 24 using the input torque thus obtained, will be explained with reference to FIG. 11. The program shown there is executed at every predetermined interval, e.g., 20 ms.

Figure 12:
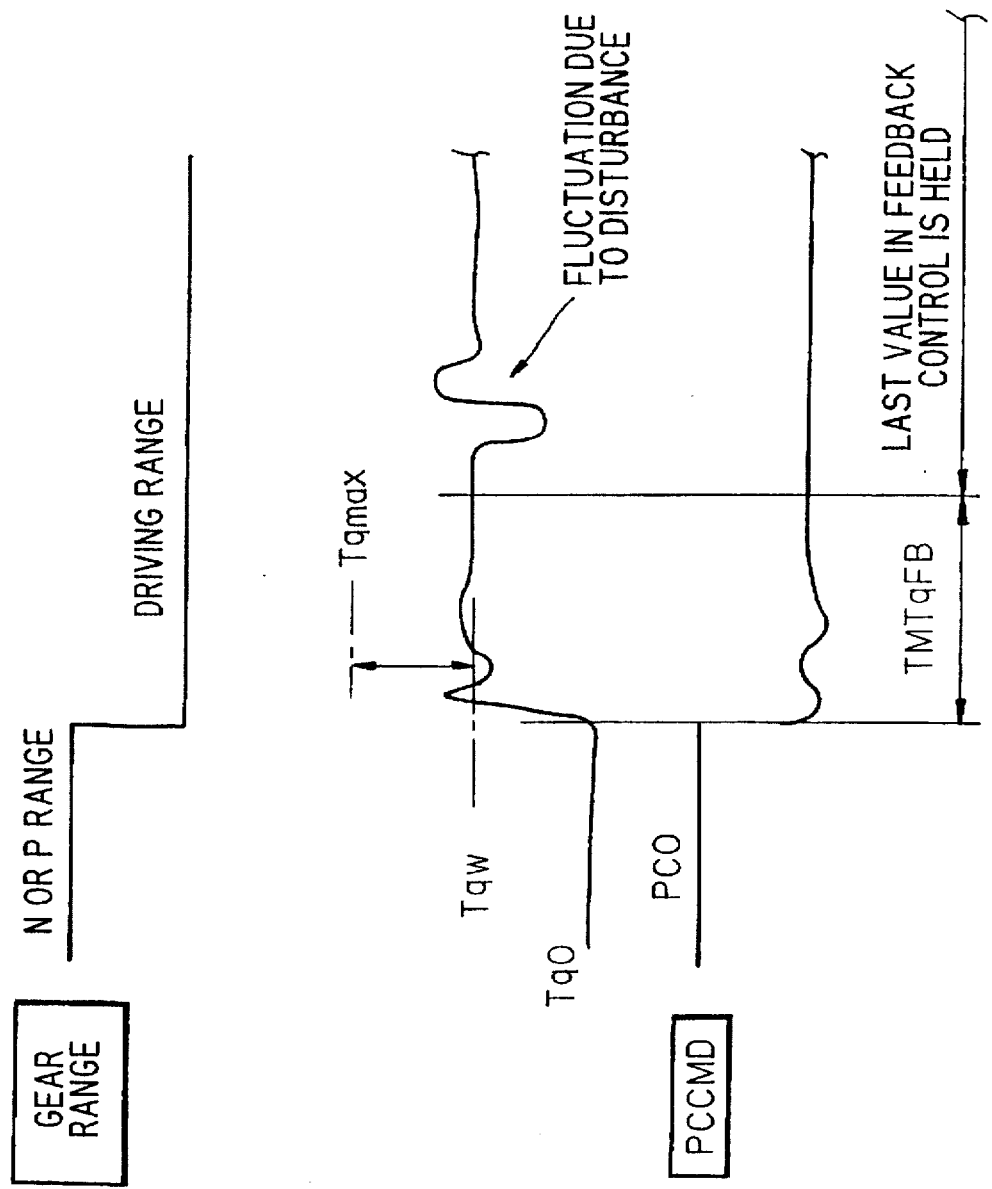
FIG. 12 is a timing chart showing the control according to the invention and shown in the flowchart of FIG. 11.

Before entering the explanation of the flowchart, however, the control according to the invention will be explained first with reference to FIG. 12 and on.

As mentioned above, by detecting the torque transmitted by the dual-mass flywheel and input to the transmission 10, i.e., the start clutch 24, oil pressure to be supplied to the start clutch is determined based on the detected torque such that the creep torque is appropriate when the vehicle is stopped with its foot brake being depressed and with its gears in a drive range such as D, thereby decreasing vibration or juddering and improving fuel economy during engine idling state.

To be more specific, as will be illustrated in FIGS. 12 and 17 which will later be referred to, when the gear range is switched from the non-drive range, i.e., N, P to the drive range, e.g., D (in other words when in-geared), a difference between the calculated torque Tq0 immediately before the in-gear and that Tqw after the in-gear is calculated to determine or estimate the torque actually input to the start clutch. And based on the determined torque, a desired oil pressure to the start clutch is determined and based thereon, an oil pressure command value to the start clutch is P (proportion) and I (integral) controlled for a predetermined period or time TMTqFB. In the control, a desired value is determined to be at or below an upper limit Tqmax (that is the absolute value of the difference, i.e. |Tqw−Tq0|). After the period has lapsed, the oil pressure is held to be the last value in the feedback control so as not to be affected by the torque fluctuation due to a disturbance. Since no torque after the in-gear is available immediately after the engine has been started, another mapped data are prepared for controlling the oil pressure at that stage.

Now, the operation of the system will be explained with reference to the flowchart of FIG. 11.

First in S10, it is checked whether the engine 80 is under the idling operation and the fast-idling state is relieved. The determination whether the engine is idling is conducted by determining whether the output θTH of the throttle position sensor 85 is a value corresponding to zero indicating that the throttle valve is not opened. The determination whether the fast-idling state is relieved is done by determining the engine speed Ne is not less than a predetermined value α.

Since the system aims to control the clutch, in other words the creep torque at the engine idling, when it is found in this step that the engine is not in the idling state, the program should be terminated immediately and another control (not explained) will be conducted. And, since it is not possible to use the torque after in-gear when the engine is in the fast-idling state immediately after the engine has been started, the control is conducted using the other mapped data as mentioned before.

When the decision in S10 is negative, the program is immediately terminated, while if the result is affirmative, the program proceeds to S12 in which the torsional phase angle θc between the two flywheel components are read, and proceeds to S14 in which the average value θc-av of the angles is calculated by averaging the current value and the most recent four values (the values obtained for 100 ms at five program loops). If the number of program loops is less than five, it is alternatively possible to use the current value, or to repeat S12 and S14 to obtain the average. It is alternatively possible to calculate, instead of a simple average, other averages including a weighted average of the values.

The program then goes to S16 in which it is checked which gear range is selected from the output ATP of the position switch 230. When it is found in S16 that the gears are in the non-driving range, i.e., N or P, this means that the averaged torsional phase angle θc-av is a value when the vehicle is not driving, in other words, it is a value when the V-belt drive mechanism 16 does not transmit power. The program then moves to S18 in which the averaged value is rewritten as X0 and the program is terminated. Since the gears are usually in either of these ranges when the engine is just started, the program will be looped from S12 to S14, S16 and terminated after S18 and the same procedure will be repeated.

Then, when the selector lever is switched to the driving range and when S16 finds that the gears are in one among the L, S, D, R ranges, the program moves to S20 in which it is checked whether the foot brake is depressed from an output of the brake switch 232 such the vehicle is stopped. As mentioned frequently, the control aims to decrease the vibration or juddering and improve fuel economy when the vehicle is braked and halted with the gears in the driving range. If the vehicle is stopped with the brake being out of operation, the vehicle would start to run slowly. The control in that situation is not the theme of the invention. When the result in S20 is negative, the program is therefore terminated.

On the other hand, when the result in S20 is affirmative, the program advances to S22 in which the average X0 of the torsional phase angles in the non-driving condition obtained in S18 is subtracted from the average θc-av of the torsional phase angles in the driving condition obtained in S14 and the calculated difference is named X. The reason why X0 is subtracted is that, since the torsional angle X0 in the non-driving condition, i.e., the torsional angle when the start clutch 24 is not engaged (or is not fully engaged), is considered to be the torque or friction consumed by the mass of an element or component positioned upstream of the start clutch. It can therefore be considered that the torque obtained from the value X0 does not constitute the torque that is actually input to the start clutch 24.

The program then goes to S24 in which the value X obtained in S20 is used as an address in the mapped data (whose characteristics are shown in FIG. 9) to retrieve the (static) torsional torque Tq. The program then moves to S26 in which the start clutch is controlled based on the obtained torsional torque Tq.

Figure 13:
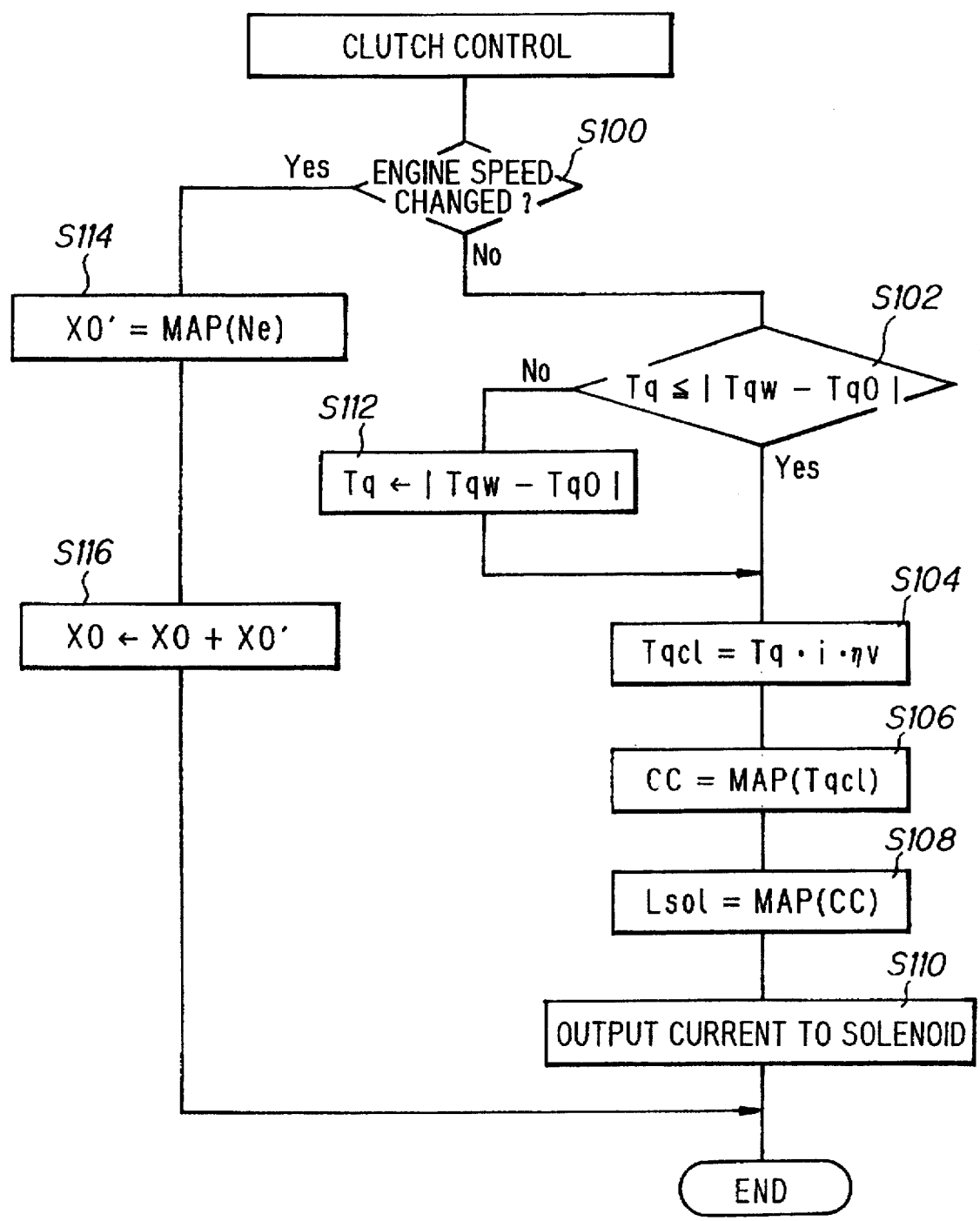
FIG. 13 is a flowchart showing the subroutine of the control shown in the flowchart of FIG. 11.

FIG. 13 is a flowchart showing the subroutine of the clutch control.

Figure 11:
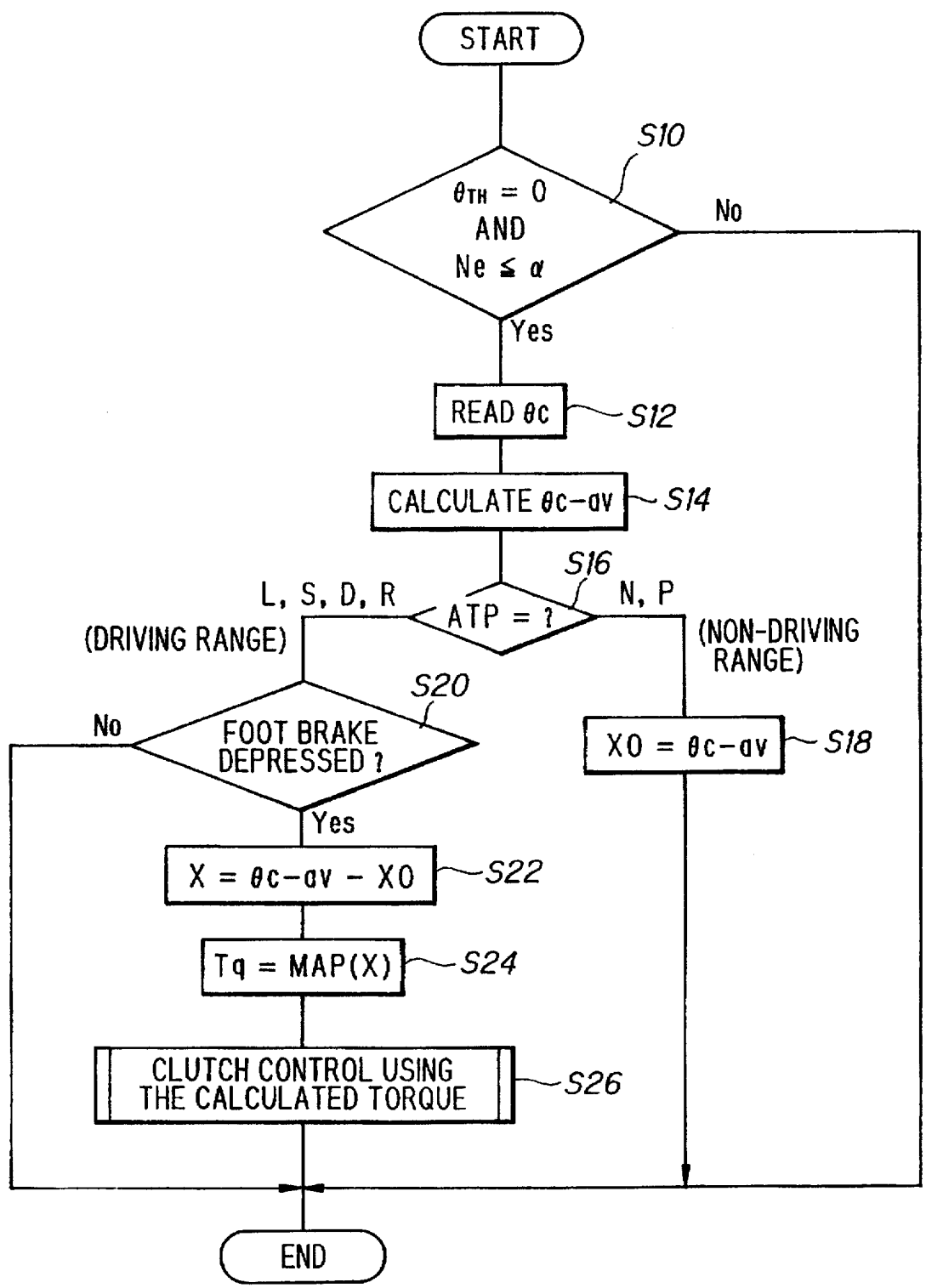
FIG. 11 is a flowchart showing the operation of the torque detection system and control system according to the invention.

Explaining this, the program begins in S100 in which the engine speed Ne is read out and it is checked if the read engine speed Ne has changed from the previous engine speed at which the average X0 of the torsional phase angle in the non-driving condition was calculated in S18 in the flowchart of FIG. 11.

Figure 14:
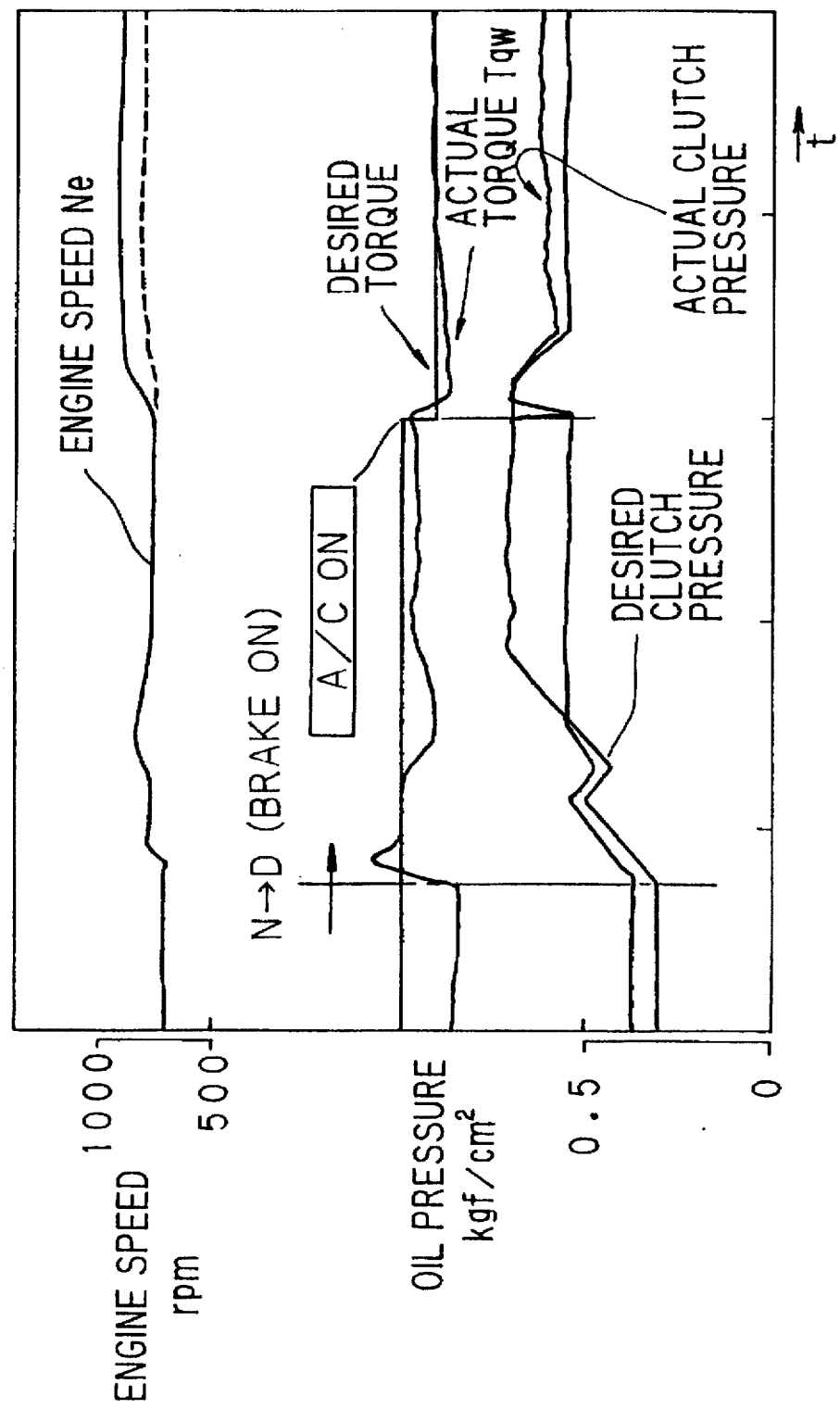
FIG. 14 is simulation data showing the clutch control when an air conditioner mounted on the vehicle is brought into operation.

More specifically, as disclosed in simulation data in FIG. 14, when the air conditioner is brought into operation, the ECU 82 raises the engine speed to compensate the torque consumed by the air conditioner. If it does, it becomes necessary to lower the clutch control oil pressure to lessen the creep torque amount. This will be done by correcting the value X0 in S114, S116 such that a desired creep torque amount is, as a result, decreased, as will be explained later.

When S100 finds no change has occurred in the engine speed Ne, the program advances to S102 in which it is checked whether the obtained torsional torque Tq is not less than an upper limit Tqmax (i.e., |Tqw−Tq0|). When the decision in S102 is affirmative, the program proceeds to S104 in which the torque (amount) Tqcl estimated to be actually input to the start clutch is calculated by multiplying the torsional torque Tq by the overall reduction ratio i of the forward/reverse switching mechanism 20 and the V-belt drive mechanism 16 and the total efficiency ηv up to the start clutch 24. Here, the overall reduction ratio i is obtained based on a ratio between the input shaft speed Ndr and the driven-side pulley speed Ndnp.

Figure 15:
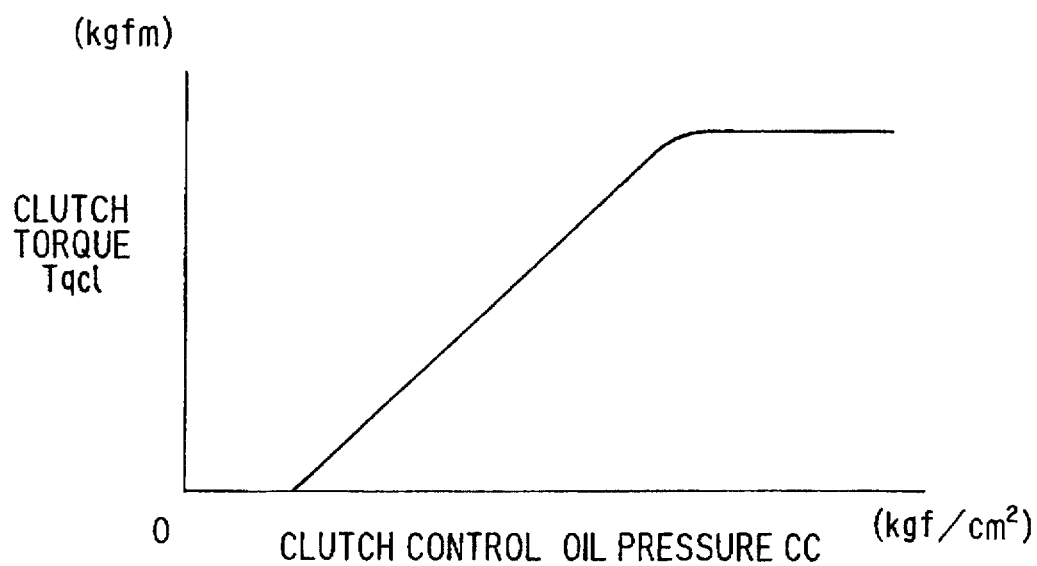
FIG. 15 is an explanatory graph showing the relationship between the clutch torque and the clutch control oil pressure.
Figure 16:
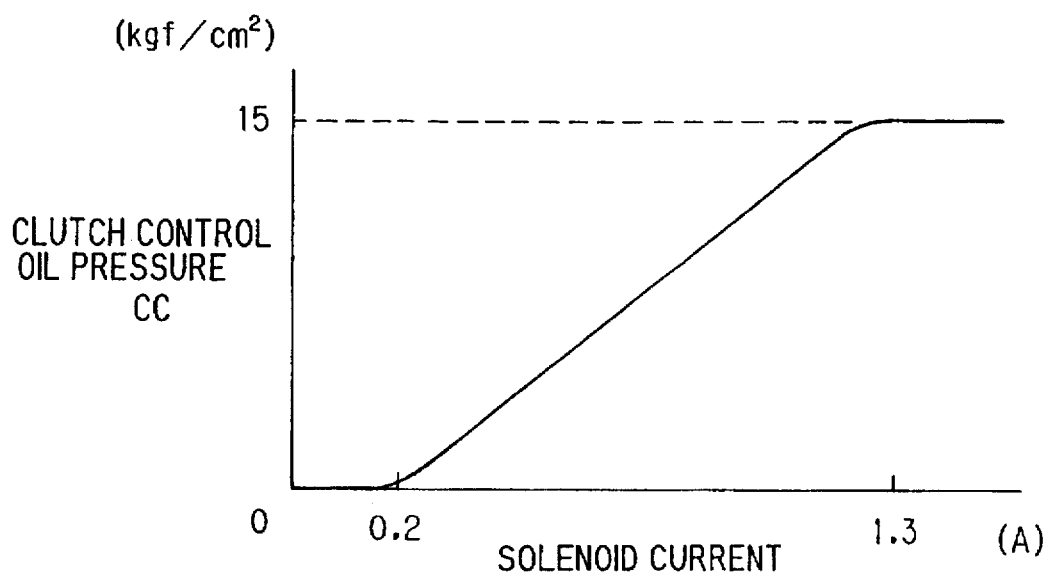
FIG. 16 is an explanatory graph showing the clutch control oil pressure and current supply to an electromagnetic solenoid of a clutch control valve.

The program then goes to S106 in which the torque Tqcl estimated to be actually input to the start clutch 24 is used as an address to retrieve a desired clutch oil pressure CC from mapped data (whose characteristics are shown in FIG. 15) stored in the ROM in the ECU 82 in advance. The program then goes to S108 in which the desired clutch oil pressure CC is used as an address to retrieve the current to be supplied to the aforesaid electromagnetic solenoid 214sl from mapped data (whose characteristics are illustrated in FIG. 16) stored beforehand in the ROM in the ECU 82. The program then proceeds to S110 in which the current thus obtained is supplied to a driver (not shown) of the electromagnetic solenoid 214sl and the program is terminated.

When the result in S102 is negative, the program proceeds to S112 in which the calculated torsional torque Tq is replaced by the upper limit. When S100 finds that the engine speed Ne has changed, since the creep torque amount is affected by the engine speed change, the program goes to S114 in which a corrected value X0' is retrieved using the engine speed Ne as address datum from mapped data (whose characteristics are not shown). The program then goes to S116 in which the corrected value X0' is added to X0 to update X0.

Figure 17:
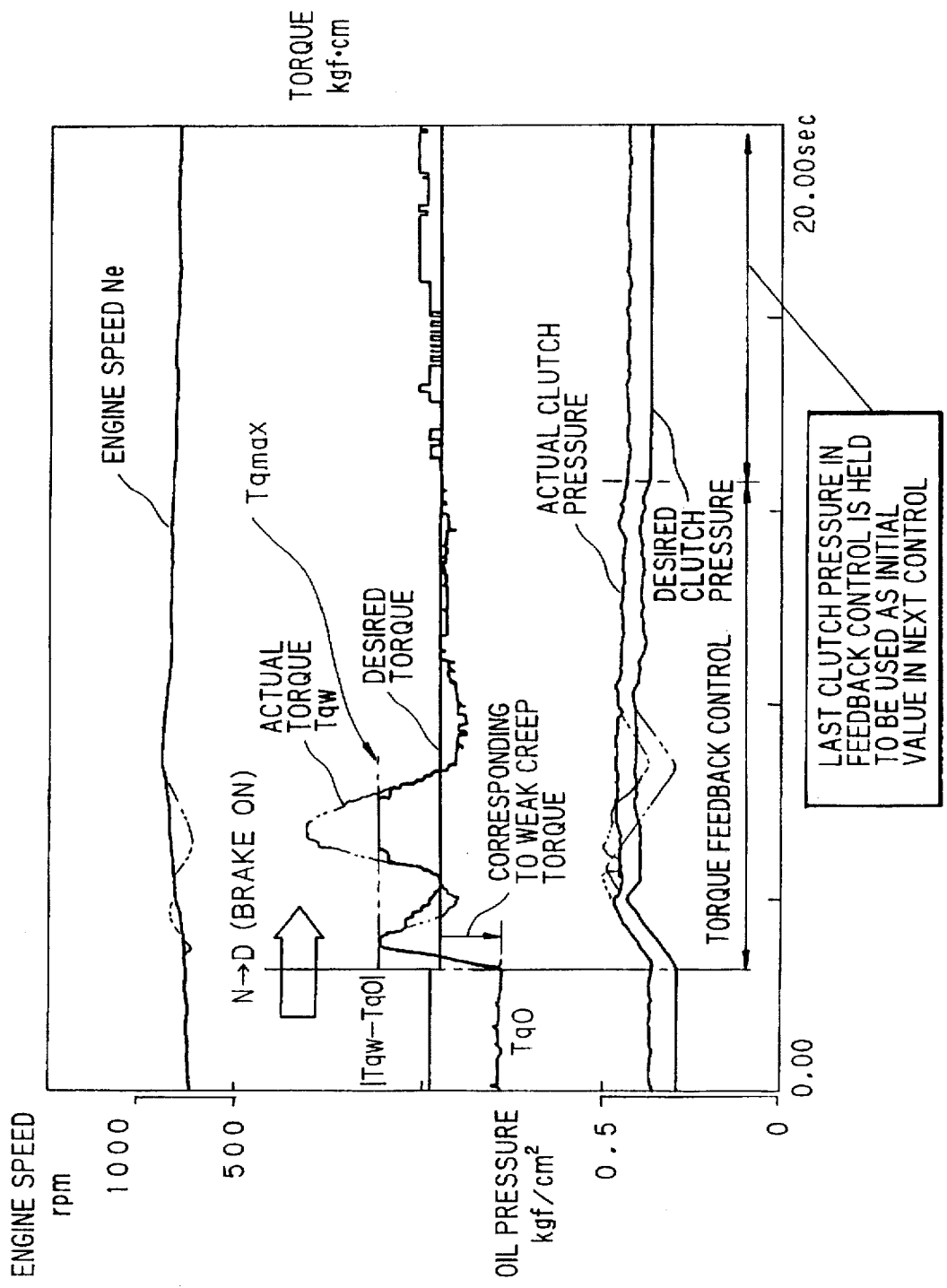
FIG. 17 is simulation dam showing the result of the clutch control according to the invention.

FIG. 17 is simulation data showing the result of the control mentioned above.

When the gear range is switched from N to D, the oil pressure of the start clutch is PI-controlled to the desired value as illustrated in the lower half of the figure. With this arrangement, the torque estimated to be actually input to the start clutch 24 converges to a desired value as illustrated in the upper half of the figure. The top of the figures illustrates the engine speed at that time. In the figure, phantom lines (two-dotted lines) show results which would occur when the control is assumed to be not conducted. As will be understood from the figure, a stable creep torque is achieved while suppressing the fluctuation of the engine speed.

Moreover, the value Tq is limited at or below the upper limit such that the desired clutch pressure CC is determined based on Tqcl (calculated from Tq), and if the input torque fluctuates, the influence of the torque fluctuation can be limited, thereby achieving a stable creep torque. Furthermore, even when the engine speed is raised due to the beginning of the air conditioner operation during the gear range switching, since the torsional phase angle is corrected, it becomes possible to properly determine the torque estimated to be actually input to the start clutch.

Figure 18:
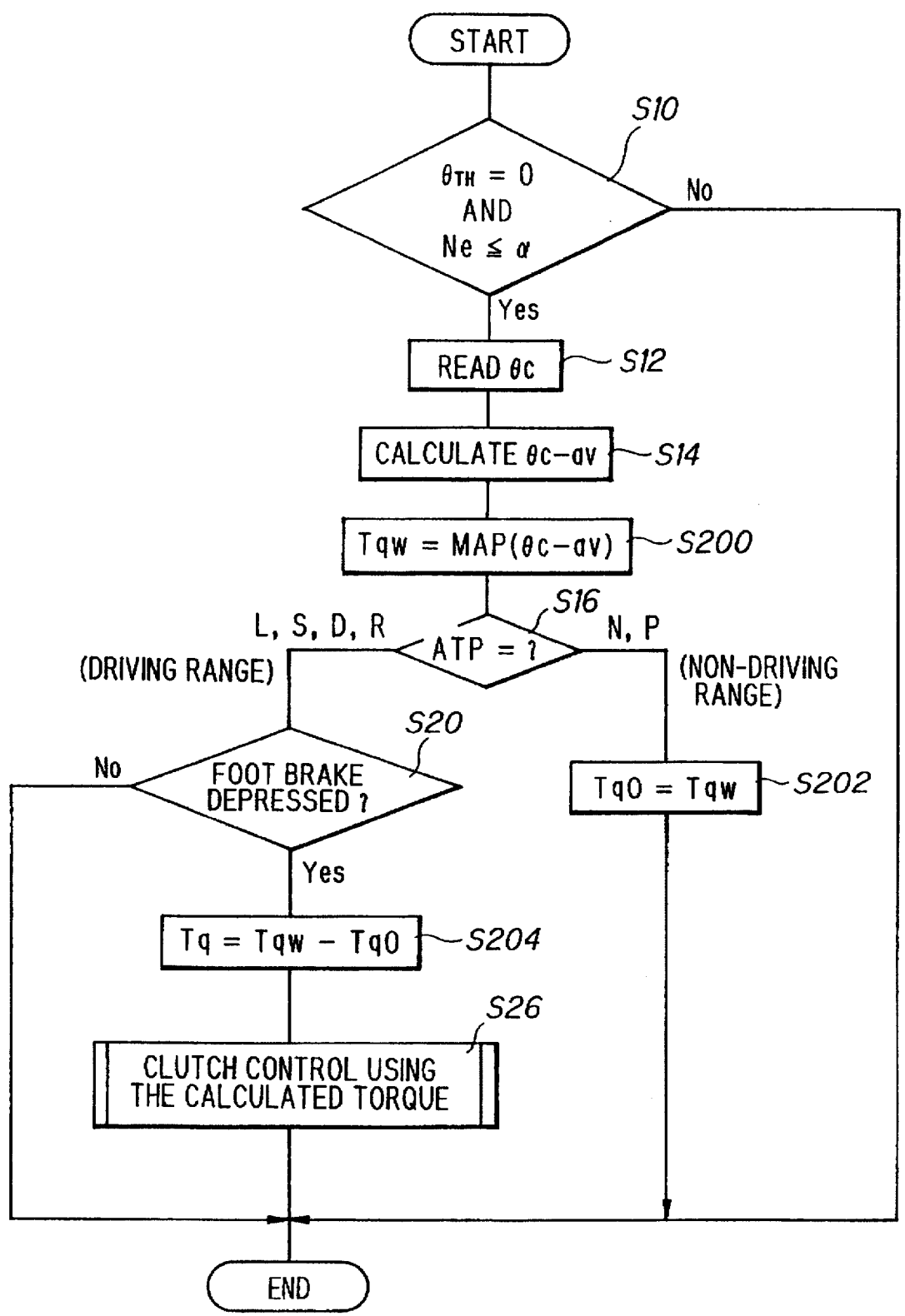
FIG. 18 is a view, similar to FIG. 11, but showing the operation of the system according to a second embodiment of the invention.

FIG. 18 is a flowchart, similar to FIG. 11, but showing the operation of the system according to a second embodiment of the invention. In the figure, the same reference numeral means that the same processing as that in FIG. 11 is conducted.

Figure 10:
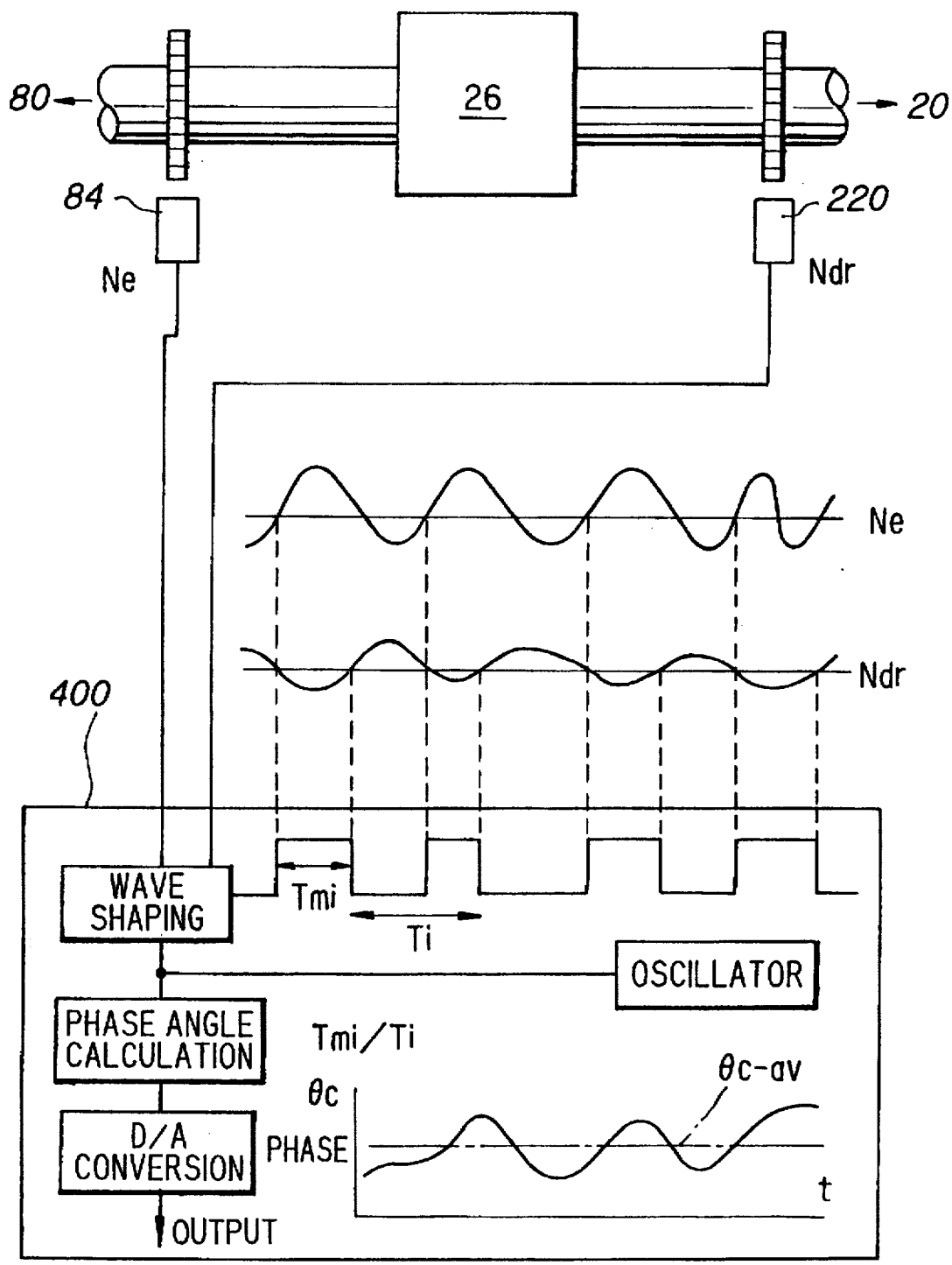
FIG. 10 is an explanatory view showing the detection or calculation of the torsional phase angle using a converter.

Explaining the flowchart, the program starts at S10 and goes to S14 via S12 similarly to the flowchart of FIG. 10, and it advances to S200 in which a torsional torque Tqw is retrieved from the mapped data by the averaged value θc-av. The program then goes to S16 in which the gear range is checked. When the gears are found to be in the non-driving range, since this means that the calculated torsional torque Tqw is a torque when the vehicle is not running, i.e., a torque when the V-belt drive mechanism does not transmit power, the program goes to S202 in which the value is renamed as Tq0 and the program is terminated.

When S16 finds that the gears are in the driving range in the next program loop or thereafter, the program goes to S20 in which it is checked whether the foot brake is depressed and if it is, the program goes to S204 in which the torsional torque difference Tq is calculated as illustrated, to S26 in which the start clutch control is conducted based on the calculated torsional torque.

Figure 19:
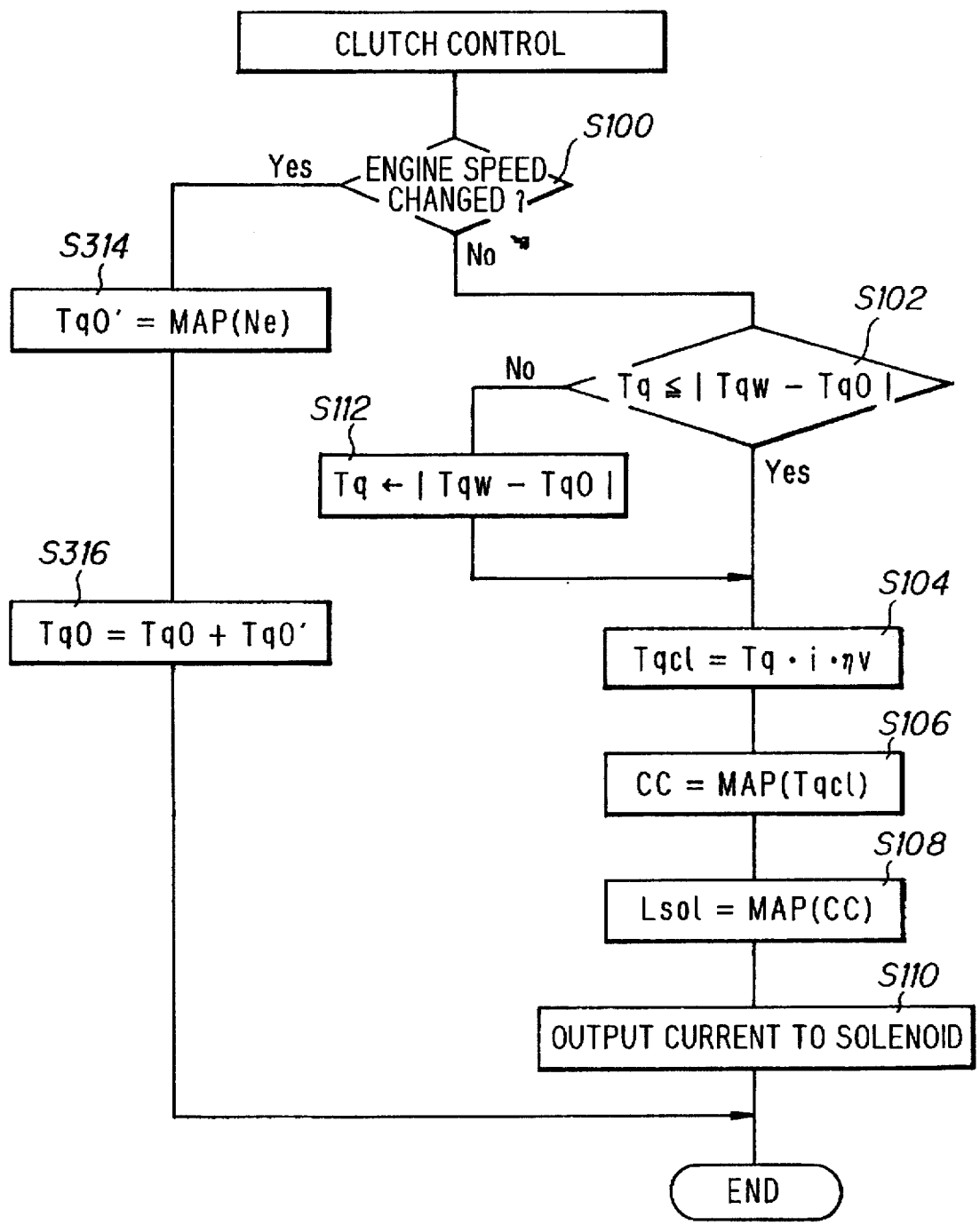
FIG. 19 is a view, similar to FIG. 13, but showing the control of the system according to the second embodiment of the invention.

FIG. 19 is a flowchart showing the subroutine of the control.

Explaining this focusing on the difference from the first embodiment, the program begins at S100 and goes to S102 to S112 similarly to the first embodiment.

When S100 finds that the engine speed Ne has changed, the program goes to S314 in which a corrected value Tq0' is obtained from mapped data retrieval using the engine speed Ne as an address, and proceeds to S316 in which the value Tq0 is corrected in the manner similar to the first embodiment. To be more specific, in the second embodiment, the torque is first calculated and then it is checked whether the gears are in the driving range.

In the second embodiment, thus, the torsional angle is first converted into the torque and it is then determined whether the calculated torque is a value in the driving range. In other words, the torque estimated to be actually input to the start clutch is obtained by subtracting the torque in the non-driving gear range from that in the driving gear range. The advantages and effects are therefore the same as those in the first embodiment.

In the above, the system for detecting a torque in an automatic transmission (10) mounted on a vehicle having an engine (80) and wheels to be driven by power transmitted from the engine (80) through the transmission (10) is arranged such that it includes an elastic coupling means (26) connected to an output shaft (28) of the engine (80); detecting means (84) for detecting a rotational speed (Ne) input to the elastic coupling means (26); detecting means (220) for detecting a rotational speed (Ndr) output from the elastic coupling means (26); a frictional engaging element (24, 50, 54) provided for engaging disengaging power transmitted to the wheels; and torque calculating means for calculating a first torque (θc) based on a difference between the detected rotational speeds (Ne, Ndr) when the fictional engaging element (24, 50, 54) is in an engaged state and a second torque (X0, Tq0) based on the difference between the detected rotational speeds (Ne, Ndr) when the fictional engaging element (24, 50, 54) is in a disengaged state, to calculate a torque (Tq) estimated to be actually input to the frictional engaging element (24, 50, 54) based on the first torque and the second torque.

To be more specific, it is arranged such that said elastic coupling means is a dual-mass flywheel comprising two flywheel components coupled by a torsion spring.

To be more specific, it is arranged such that said torque calculating means includes; first phase angle calculating means for calculating a phase angle (θc) based on a difference between the detected rotational speeds (Ne, Ndr) when the frictional engaging element (50, 54) is in an engaged state; second phase angle calculating means for calculating a phase angle (X0, Tq0) based on a difference between the detected rotational speeds (Ne, Ndr) when the frictional engaging element (50, 54) is in a disengaged state, and torque determining means for determining the torque (Tq) estimated to be actually input to a clutch (24) by calculating a difference between the phase angles (θc-X0) and by retrieving the torque (Tq) from predetermined characteristics based on the difference.

To be more specific, it is arranged such that said torque calculating means includes; torque calculating means for calculating a phase angle (θc) based on a difference between the detected rotational speeds (Ne, Ndr) and by retrieving based on the difference a first torque (Tqw) when the gears are in a driving range (D) and a second torque (Tq0) when the gears are in a range (N, P) other than the driving range from the predetermined characteristic; and torque determining means for determining the torque (Tq) estimated to be actually input to a clutch (24) by calculating a difference (Tqw-Tq0).

To be more specific, it is arranged such that said torque calculating means includes; first phase angle calculating means for calculating a phase angle (θc) based on a difference between the detected rotational speeds (Ne, Ndr) when the gears are in a driving range (D); second phase angle calculating means for calculating a phase angle (X0, Tq0) based on a difference between the detected rotational speeds (Ne, Ndr) when the gears are in a range (N, P) other than the driving range, and torque determining means for determining the torque (Tq) estimated to be actually input to a start clutch (24) by calculating a difference of the phase angles (θc-X0) and by retrieving the torque (Tq) based on the difference from the predetermined characteristics.

To be more specific, it is arranged such that said torque calculating means includes; torque calculating means for calculating a phase angle (θc) based on a difference between the detected rotational speeds (Ne, Ndr) and by retrieving by the difference a first torque (Tqw) when the frictional engaging element (50, 54) is engaged and a second torque (Tq0) when the frictional engaging element (50, 54) is not engaged, from the predetermined characteristics; and torque determining means for determining the torque (Tq) estimated to be actually input to a start clutch (24) by calculating a difference (Tqw-Tq0).

To be more specific, it is arranged such that the phase angles are calculated by averaging.

To be more specific, it is arranged such that it further includes idle state determining means (S10) for determining whether the engine is in an idling state; and braking operation detecting means for detecting whether the vehicle is braked to stop; and said torque determining means determines the torque (Tq) when the engine is in the idling state while the vehicle is braked to stop.

To be more specific, it is arranged such that it further includes desired oil pressure determining means (S106) for determining a desired oil pressure (CC) for the clutch (24) based on the determined torque (Tq).

To be more specific, it is arranged such that said desired oil pressure determining means limits the torque (Tq) when the torque (Tq) is found to exceeds a limit (|Tqw-Tq0|) To be more specific, it is arranged such that said desired oil pressure determining means determines the desired oil pressure (CC) such that the desired oil pressure (CC) is within a range corresponding to that defined by the limit.

To be more specific, it is arranged such that it further includes engine speed change detecting means (S100) for detecting whether an engine speed has changed when the frictional engaging element is switched from the disengaged state to the engaged state; and said desired oil pressure determining means corrects the torque (Tq) by a torque (X0', Tq0') that compensates the engine speed change.

It should be noted that the start clutch of the V-belt drive continuously variable transmission is taken as example of the frictional engaging element, the start clutch should not be limited to that used in this type of continuously variable transmission. And the start clutch should not be limited to the hydraulically operated clutch and any other clutch can be used. For example, it is possible to use an electromagnetic clutch that is controlled by the PWM.

It should also be noted that the frictional engaging element is not be limited to the start clutch and includes a clutch or a brake used to connect or disconnect the power transmission in a stepped transmission. It should also be noted that the invention is applicable to an continuously variable transmission having a torque converter which operates to regulate the creep torque mentioned above.

It should further be noted that the checking as to whether the fast idling is relieved in S10 is conducted by comparing the engine speed with the predetermined value, it is alternatively possible to make the checking by measuring the time lapse since the engine start and by comparing the measured time with a prescribed time. Further it is alternatively possible to use, instead of a throttle sensor, an accelerator pedal position switch in the determination of the engine idling condition.

It should further be noted that the determination as to whether the vehicle is stopped with the gears in the driving range in S20 is conducted by checking whether the foot brake is depressed, it is alternatively possible to determine this by checking whether the mechanical parking brake is in operation, or by checking whether the vehicle speed is zero.

It should further be noted that, although the values X0, Tq0 are corrected in S116, S316 by addition, it is alternatively possible to obtain a coefficient to be multiplied.

It should further be noted that the control can be used in control creep torque for the stopped vehicle not being braked to start to run quite slowly.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for detecting a torque in an automatic transmission mounted on a vehicle having an engine and wheels to be driven by power transmitted from the engine through the transmission;

wherein the improvement comprises:
- a) an elastic coupling means connected to an output shaft of the engine;
- b) detecting means for detecting a rotational speed input to the elastic coupling means;
- c) detecting means for detecting a rotational speed output from the elastic coupling means;
- d) a frictional engaging element provided for engaging/ disengaging power transmitted from the engine to the wheels; and
- e) torque calculating means for calculating a first torque based on a difference between the detected rotational speeds when the frictional engaging element is in an engaged state and a second torque based on the difference between the detected rotational speeds when the frictional engaging element is in a disengaged state, to calculate a torque estimated to be actually input to the frictional engaging element based on the first torque and the second torque.

wherein said frictional engaging element is controlled to be engaged based upon the calculated torque of the elastic coupling means.

2. A system according to claim 1, wherein said elastic coupling means is a dual-mass flywheel comprising two flywheel components coupled by a torsion spring.

3. A system according to claim 2, wherein said torque calculating means includes;
- first phase angle calculating means for calculating a phase angle based on a difference between the detected rotational speeds when the frictional engaging element is in an engaged state;
- second phase angle calculating means for calculating a phase angle based on a difference between the detected rotational speeds when the frictional engaging element is in a disengaged state, and
- torque determining means for determining the torque estimated to be actually input to a clutch by calculating a difference between the phase angles and by retrieving the torque by the difference from predetermined characteristics.

4. A system according to claim 2, wherein said torque calculating means includes;
- torque calculating means for calculating a phase angle based on a difference between the detected rotational speeds and by retrieving by the difference a first torque when the gears are in a driving range and a second torque when the gears are in a range other than the driving range, from predetermined characteristics; and
- torque determining means for determining the torque estimated to be actually input to a clutch by calculating a difference to determine the torque.

5. A system according to claim 2, wherein said torque calculating means includes;
- first phase angle calculating means for calculating a phase angle based on a difference between the detected rotational speeds when the gears are in a driving range;
- second phase angle calculating means for calculating a phase angle based on a difference between the detected rotational speeds when the gears are in a range other than the driving range, and
- torque determining means for determining the torque estimated to be actually input to a start clutch by calculating a difference of the phase angles and by retrieving the torque by the difference from predetermined characteristics.

6. A system according to claim 2, wherein said torque calculating means includes;
- torque calculating means for calculating a phase angle based on a difference between the detected rotational speeds and by retrieving by the difference a first torque when the frictional engaging element is engaged and a second torque when the frictional engaging element is not engaged, from predetermined characteristics; and
- torque determining means for determining the torque estimated to be actually input to a start clutch by calculating a difference to determine the torque.

7. A system according to claim 3, wherein the phase angles are calculated by averaging.

8. A system according to claim 3, further including;

idle state determining means for determining whether the engine is in an idling state; and braking operation detecting means for detecting whether the vehicle is braked to stop;

and said torque determining means determines the torque when the engine is in the idling state while the vehicle is braked to stop.

9. A system according to claim 4, further including;

idle state determining means for determining whether the engine is in an idling state; and braking operation detecting means for detecting whether the vehicle is braked to stop;

and said torque determining means determines the torque when the engine is in the idling state while the vehicle is braked to stop.

10. A system according to claim 5, further including;

idle state determining means for determining whether the engine is in an idling state; and braking operation detecting means for detecting whether the vehicle is braked to stop;

and said torque determining means determines the torque when the engine is in the idling state while the vehicle is braked to stop.

11. A system according to claim 6, further including;

idle state determining means for determining whether the engine is in an idling state; and braking operation detecting means for detecting whether the vehicle is braked to stop;

and said torque determining means determines the torque when the engine is in the idling state while the vehicle is braked to stop.

12. A system according to claim 3, further including;

desired oil pressure determining means for determining a desired oil pressure for the clutch based on the determined torque.

13. A system according to claim 4, further including;

desired oil pressure determining means for determining a desired oil pressure for the clutch based on the determined torque.

14. A system according to claim 5, further including;

desired oil pressure determining means for determining a desired oil pressure for the clutch based on the determined torque.

15. A system according to claim 6, further including;

desired oil pressure determining means for determining a desired oil pressure for the clutch based on the determined torque.

16. A system according to claim 9, wherein said desired oil pressure determining means limits the torque when the torque is found to exceed a limit.

17. A system according to claim 12, wherein said desired oil pressure determining means limits the torque when the torque is found to exceed a limit.

18. A system according to claim 16, wherein said desired oil pressure determining means determines the desired oil pressure such that the desired oil pressure is within a range corresponding to that defined by the limit.

19. A system according to claim 12, further including:

engine speed change detecting means for detecting whether an engine speed has changed when the frictional engaging element is switched from the disengaged state to the engaged state;

and said desired oil pressure determining means corrects the torque by a torque that compensates the engine speed change.

20. A system for detecting a torque in an automatic transmission mounted on a vehicle having an engine and wheels to be driven by power transmitted from the engine through the transmission;

wherein the improvement comprises:

a) a dual-mass flywheel connected to an output shaft of the engine and having a first flywheel component and a second flywheel component coupled by a torsion spring;

b) detecting means for detecting a rotational speed of the first flywheel component;

c) detecting means for detecting a rotational speed of the second flywheel component;

d) a start clutch provided for engaging/disengaging power transmitted to the wheels from the engine; and e) torque calculating means for calculating a first torque based on a difference between the detected rotational speeds when gears are in a driving range and a second torque based on the difference between the detected rotational speeds when the gears are in a no-driving range, to calculate a torque estimated to be actually input to the start clutch based on the first torque and the second torque, wherein the start clutch is controlled to be engaged based upon the calculated torque of the dual-mass flywheel.

21. A system according to claim 20, wherein said torque calculating means includes;

first phase angle calculating means for calculating a phase angle based on a difference between the detected rotational speeds when the gears are in a driving range;

second phase angle calculating means for calculating a phase angle based on a difference between the detected rotational speeds when the gears are in a range other than the driving range, and torque determining means for determining the torque estimated to be actually input to the start clutch by calculating a difference of the phase angles and by retrieving the torque by the difference from predetermined characteristics.

22. A system according to claim 20, wherein said torque calculating means includes;

torque calculating means for calculating a phase angle based on a difference between the detected rotational speeds and by retrieving by the difference a first torque when the frictional engaging element is engaged and a second torque when the frictional engaging element is not engaged, from predetermined characteristics; and torque determining means for determining the torque estimated to be actually input to the start clutch by calculating a difference to determine the torque.

* * * * *